United States Patent
Satomi et al.

(10) Patent No.: US 7,136,464 B2
(45) Date of Patent: Nov. 14, 2006

(54) SYSTEM FOR PROVIDING ELECTRONIC MAIL AND DEVICE AS WELL AS THE METHOD, PROGRAM AND STORAGE MEDIUM FOR SAME

(75) Inventors: Hiroshi Satomi, Kanagawa (JP); Satoshi Igeta, Kanagawa (JP); Atsushi Inoue, Tokyo (JP); Kosuke Ito, Tokyo (JP); Kenichiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 09/921,952

(22) Filed: Aug. 3, 2001

(65) Prior Publication Data

US 2002/0051524 A1 May 2, 2002

(30) Foreign Application Priority Data

Aug. 8, 2000 (JP) ............................. 2000-239979

(51) Int. Cl.
*H04M 1/64* (2006.01)
*G06F 15/16* (2006.01)

(52) U.S. Cl. ............................. 379/88.17; 379/88.11; 709/206

(58) Field of Classification Search ................ 706/206; 379/67.1, 88.11, 88.12, 88.13, 88.14, 88.22, 379/93.01
See application file for complete search history.

(56) References Cited

U.S. PATENT DOCUMENTS

| 4,837,798 A | 6/1989 | Cohen et al. ............. 379/88.14 |
| 5,493,692 A | 2/1996 | Theimer et al. ........... 455/26.1 |
| 5,742,668 A | 4/1998 | Pepe et al. ................. 455/415 |
| 2001/0005864 A1* | 6/2001 | Mousseau et al. .......... 709/206 |
| 2001/0034226 A1* | 10/2001 | Watanabe et al. ........... 455/412 |
| 2001/0039560 A1* | 11/2001 | Uchida et al. .............. 709/200 |

FOREIGN PATENT DOCUMENTS

EP 0 912 036 A2 4/1999

* cited by examiner

*Primary Examiner*—Ovidio Escalante
(74) *Attorney, Agent, or Firm*—Cowan, Liebowitz & Latman, P.C.

(57) ABSTRACT

A system for outputting electronic mail information, which cannot be fully displayed in a portable terminal in another terminal is provided. A mail server receives electronic mail information and determines whether or not the electronic mail information can be outputted in a destination (portable terminal) of the electronic mail information. If it is determined that the electronic mail information cannot be outputted, a P service server issues code information for outputting the electronic mail information in another terminal (P service terminal) and notifies the destination of that effect.

3 Claims, 34 Drawing Sheets

FIG. 7

IP INFORMATION REGISTRATION TABLE 311

| P-CODE | IDENTIFICATION PORTION | PARENT CODE PORTION | LINKED P-CODE |
| --- | --- | --- | --- |
| | | FLAG INDICATING WHETHER OR NOT SUB-CODE IS HELD | |
| | | SUB-CODE PORTION | |
| | | LINK | |
| | BASIC PROPERTY | OWNER ID | |
| | | TITLE | |
| | | SUBTITLE (SUMMARY) | |
| | | STATUS | REGISTERED, AVAILABLE, SUSPENSION, ABOLITION |
| | | INFORMATION PRICE | |
| | | SIZE | |
| | | TERMS AND CONDITIONS FOR ADVERTISEMENT INSERTION | |
| | | CODE NUMBER (PASSWORD) FOR ACCESSING INFORMATION | |
| | | DATE OF STARTING INSERTION OF INFORMATION | |
| | | TERM OF INFORMATION VALIDITY | |
| | | TERM OF CODE VALIDITY | |
| | | MAXIMUM EXPANSION LIMIT VALUE | |
| | | MINIMUM REDUCTION LIMIT VALUE | |
| | | GENRE | |
| | | SUB-GENRE | |
| | | AREA CODE | IN CASE OF INFORMATION HAVING AREA CHARACTERISTIC |
| | | KEYWORD LIST | |
| | | LIST OF KEYWORD WEIGHT | |
| FRAME INFORMATION | | P-CODE | |
| NON-LINK INFORMATION | | P-CODE LINKED TO THIS INFORMATION | |
| ENTITY FILE INFORMATION | | NUMBER OF FILES | |
| | | FILE NAME (LIST FOR THE NUMBER OF FILES) | |

FIG. 8

ADVERTISEMENT INFORMATION TABLE (312)

| P-CODE | ADVERTISEMENT PROPERTY | OWNER ID<br>DATE OF STARTING INSERTION OF ADVERTISEMENT<br>TERM OF ADVERTISEMENT VALIDITY<br>INFORMATION OF LINK TO IP INFORMATION | |
| --- | --- | --- | --- |
| | | | CLASSIFICATION OF LINKING METHOD<br>TARGET KEYWORD LIST<br>LIST OF TARGET KEYWORD WEIGHT |
| | | SIZE OF ADVERTISEMENT<br>CROSSWIZE/LENGTHWISE<br>ADVERTISEMENT SIZE ADJUSTING METHOD<br>SETTING OF ADVERTISEMENT INSERTING POSITION<br>UPPER LIMIT AMOUNT<br>ADVERTISEMENT PRICE INFORMATION (UNIT PRICE)<br>MAXIMUM NUMBER OF PRINTING<br>CURRENT NUMBER OF PRINTING ☆ | |
| | LINK | P-CODE | |
| | ENTITY FILE INFORMATION | NUMBER OF FILES<br>FILE NAME (LIST FOR THE NUMBER OF FILES) | |

FIG. 9

| FIG. 9A |
|---------|
| FIG. 9B |
| FIG. 9C |

| USER INFORMATION TABLE | | |
|---|---|---|
| P-CODE (TELEPHONE NUMBER) OF USER | USER PROFILE | ZIP CODE<br>ADDRESS<br>TYPE OF SERVICE TO BE USED<br>COMPANY NAME<br>CATEGORY OF BUSINESS ID<br>CATEGORY OF BUSINESS (IF OTHERS)<br>DEPARTMENT NAME<br>POST<br>DUTY<br>PRINT SHEET INFORMATION | |
| | | STANDARD OUTPUT INFORMATION | LAYOUT PRIORITY<br>SHEET SIZE<br>ORIENTATION OF SHEET<br>AMOUNT OF ADVERTISEMENT (USING BOTH SIDES ETC.) |
| | | NOTIFICATION SETTING | NOTIFICATION DESTINATION<br>NOTIFYING STATE (UPON UPDATING, ADVANCE SENDING COMPLETION OR THE LIKE) |

TO FIG. 9B

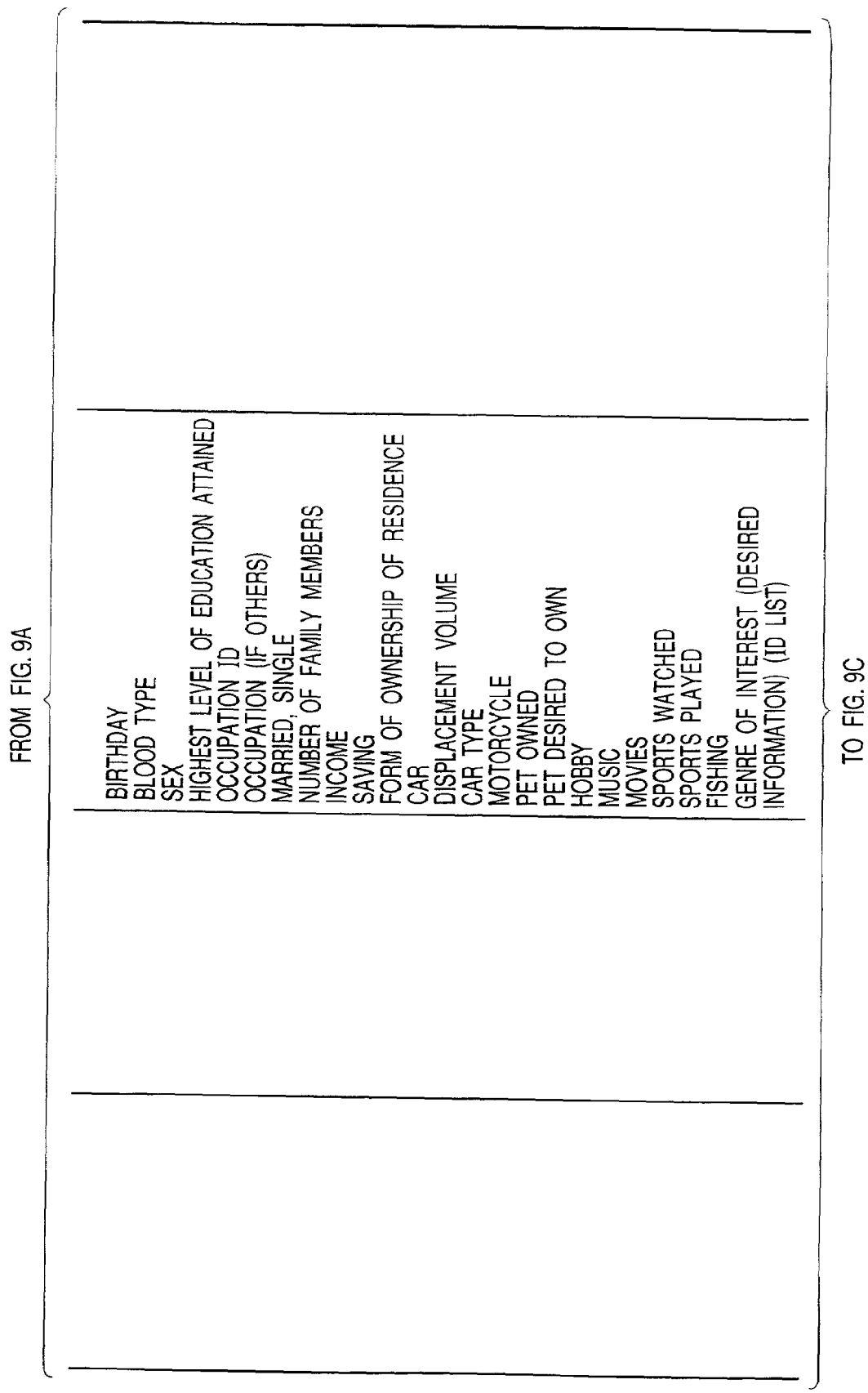

FIG. 9C

FROM FIG. 9B

| INDIVIDUAL INFORMATION TABLE | TO ANOTHER DB |
|---|---|
| INFORMATION FOR MAILING SERVICE | OBJECT MAIL ADDRESS<br>NOTIFICATION FLAG<br>SERVICE TYPE<br>NUMBER OF MAILS<br>MAXIMUM EXPANSION LIMIT VALUE<br>MINIMUM REDUCTION LIMIT VALUE<br>P-CODE LIST (FOR THE NUMBER OF MAILS) |
| INFORMATION FOR DISTRIBUTION SERVICE | NUMBER OF REGISTERED DATA<br>P-CODE LIST (FOR THE NUMBER OF DISTRIBUTION DATA) |
| INFORMATION FOR PERSONAL INFORMATION SERVICE | NUMBER OF FRAME DATA<br>P-CODE LIST (FOR THE NUMBER OF FRAME DATA) |
| INFORMATION FOR RECEIVING SERVICE | NUMBER OF REGISTERED DATA<br>P-CODE LIST (FOR THE NUMBER OF REGISTERED)<br>CHARGED PARTY FLAG<br>PASSWORD FOR RECEIVING |

FIG. 10

P-CODE TABLE FOR MAILING SERVICE — 314

| P-CODE (TELEPHONE NUMBER # NUMBER) | PROPERTY OF MAIL | SUBJECT<br>SENDER<br>DATE AND TIME OF TRANSMISSION |
|---|---|---|
| | NOTIFICATION INFORMATION PROPERTY | PRINT STATUS<br>TERMINAL ID<br>DATA DELETION NOTIFICATION FLAG |
| | ENTITY FILE INFORMATION | NUMBER OF FILES<br>(INCLUDING ATTACHED FILE)<br>FILE NAME<br>(LIST FOR THE NUMBER OF FILES) |

FIG. 11

P-CODE TABLE FOR DISTRIBUTION SERVICE — 315

| P-CODE (TELEPHONE NUMBER–NUMBER) | PROPERTY OF REGISTERED INFORMATION | TITLE※<br>DATE OF INFORMATION REGISTRATION<br>TERM OF INFORMATION VALIDITY<br>CODE NUMBER (PASSWORD)<br>FOR ACCESSING INFORMATION |
|---|---|---|
| | ENTITY FILE INFORMATION | NUMBER OF FILES<br>FILE NAME (LIST FOR THE NUMBER OF FILES) |

P-CODE TABLE FOR RECEIVING SERVICE

| P-CODE (TELEPHONE NUMBER--NUMBER) | PROPERTY OF INFORMATION | REGISTRANT P-CODE/TELEPHONE NUMBER<br>TITLE<br>DATE OF INFORMATION REGISTRATION<br>TERM OF INFORMATION VALIDITY |
|---|---|---|
| | NOTIFICATION INFORMATION PROPERTY | PRINT STATUS<br>TERMINAL ID<br>DATA DELETION NOTIFICATION FLAG |
| | ENTITY FILE INFORMATION | NUMBER OF FILES<br>FILE NAME<br>(LIST FOR THE NUMBER OF FILES) |

P CODE TABLE FOR PERSONAL INFORMATION SERVICE

| P-CODE (TELEPHONE NUMBER ## NUMBER) | INFORMATION PROPERTY FOR PERSONAL P-CODE | TITLE<br>DATE OF LAST PRINTING<br>PRINT SHEET INFORMATION | LAYOUT PRIORITY<br>SHEET SIZE<br>ORIENTATION OF SHEET<br>AMOUNT OF ADVERTISEMENT (USING BACK SIDE ETC.) |
|---|---|---|---|
| | | NUMBER OF REGISTERED P-CODES<br>P-CODE LIST (INDICATING FRAME) | |
| | REGISTERED P-CODE INFORMATION | | |

FIG. 14

| PERSONAL INFORMATION TABLE | |
|---|---|
| USER-ID | FAMILY NAME IN JAPANESE PHONETIC SYLLABARY<br>FIRST NAME IN JAPANESE PHONETIC SYLLABARY<br>FAMILY NAME<br>FIRST NAME<br>MIDDLE NAME<br>ZIP CODE<br>ADDRESS<br>TELEPHONE NUMBER<br>FAX NUMBER<br>CELLULAR PHONE NUMBER<br>E-MAIL ADDRESS<br>CODE NUMBER<br>COMPANY NAME<br>CATEGORY OF BUSINESS ID<br>CATEGORY OF BUSINESS (IF OTHERS)<br>DEPARTMENT NAME<br>POST<br>DUTY<br>COMPANY ZIP CODE<br>COMPANY ADDRESS<br>COMPANY TELEPHONE NUMBER<br>COMPANY FAX NUMBER<br>CHARGED PARTY INFOMATION | CREDIT CARD COMPANY FOR SETTLEMENT<br>CARD NUMBER<br>TERM OF CARD VALIDITY |
| | INFORMATION ON USED DISK AREA<br>CHARGE RECORD | |

| OWNER INFORMATION TABLE | SAME AS PERSONAL INFORMATION TABLE |
|---|---|
| USER-ID | COMPANY NAME/NAME<br>COMPANY ZIP CODE<br>COMPANY ADDRESS<br>COMPANY TELEPHONE NUMBER<br>COMPANY FAX NUMBER<br>E-MAIL ADDRESS OF PERSON IN CHARGE<br>CODE NUMBER<br>CATEGORY OF BUSINESS ID<br>CATEGORY OF BUSINESS (IF OTHERS)<br>DEPARTMENT NAME<br>CHARGED PARTY INFORMATION |
| | DEBITING BANK<br>DEBITING BANK ACCOUNT<br>TERM OF CONTRACT |
| | INFORMATION ON USED DISK AREA<br>CHARGE RECORD |

| TERMINAL INFORMATION TABLE | | |
|---|---|---|
| TERMINAL ID | OWNER ID<br>TERMINAL FORMAT<br>AREA INFORMATION | COUNTRY<br>ADDRESS |
| | TERMINAL VERSION<br>TERMINAL SOFTWARE VERSION<br>TERMINAL INPUT APPARATUS INFORMATION<br>TERMINAL STORAGE APPARATUS CAPACITY<br>TERMINAL OUTPUT APPARATUS INFORMATION<br>LANGUAGE<br>PRINT CAPABILITY | SHEET SIZE<br>BOTH SIDES/ONE SIDE<br>COLOR/BLACK AND WHITE<br>PRINT SPEED<br>FONT |
| | TERMINAL STATE INFORMATION | PRINT SPOOL STATE<br>PRINT APPARATUS<br>AVAILABILITY INFORMATION<br>P-CODE CACHE STATUS |

| FIG. 17A | FIG. 17B | FIG. 17C |

FIG. 17A

| BIT | CONTENTS OF P-CODE |
|---|---|
| 1 | 0: P-CODE FOR IP (BIT REPRESENTING WHETHER OR NOT P-CODE IS TELEPHONE CODE) |
| 2 – 8 | VERSION BIT (7 BITS) |
| 9 – 16 | COUNTRY NUMBER IDENTIFICATION BIT (8 BITS) (USER DOES NOT INPUT USUALLY) |
| 17 | 0: P SERVICE SERVER / 1: IP SERVER |
| 18 19 20 | BIT FOR INFORMATION ID (38 BITS) / IP SIZE DETERMINATION BIT (3 BITS) (=1: EXTREMELY SMALL SIZE, =2: SMALL SIZE, =3: MEDIUM SIZE, =4: LARGE SIZE, =5: EXTREMELY LARGE SIZE) |
| 21 – 28, 29 – 32, 33 – 36, 37 – 40 | SITE IDENTIFICATION BIT (24 BITS) (IN CASE OF EXTREMELY SMALL SIZE IP) THE NUMBER OF REGISTRABLE IP IS 16 MILLION COMPANIES | SITE IDENTIFICATION BIT (20 BITS) (IN CASE OF SMALL SIZE IP) THE NUMBER OF REGISTRABLE IP IS 1,048,575 COMPANIES |
| 41 – 44 | | BIT FOR INDIVIDUAL INFORMATION ID (15 BITS) EACH IP IS MAXIMUM APPROXIMATELY 32,767 |
| 45 – 55 | BIT FOR INDIVIDUAL INFORMATION ID (11 BITS) EACH IP IS MAXIMUM APPROXIMATELY 2,047 | |
| 56 – 64 | SUFFIX (9 BITS) MAXIMUM 512 |

FROM FIG. 17A

| SITE IDENTIFICATION BIT (16 BITS) (IN CASE OF MEDIUM SIZE IP) THE NUMBER OF REGISTRABLE IP IS 65,535 COMPANIES | SITE IDENTIFICATION BIT (12 BITS) (IN CASE OF LARGE SIZE IP) THE NUMBER OF REGISTRABLE IP IS 2,047 COMPANIES | SITE IDENTIFICATION BIT (8 BITS) (IN CASE OF EXTREMELY LARGE SIZE IP AND CANDI SERVER) THE MAXIMUM NUMBER OF REGISTRABLE IP IS 255 COMPANIES |
|---|---|---|
| BIT FOR INDIVIDUAL INFORMATION ID (19 BITS) EACH IP IS MAXIMUM APPROXIMATELY 500 THOUSAND | BIT FOR INDIVIDUAL INFORMATION ID (23 BITS) EACH IP IS MAXIMUM APPROXIMATELY 8 MILLION | BIT FOR INDIVIDUAL INFORMATION ID (27 BITS) EACH IP IS MAXIMUM APPROXIMATELY 130 MILLION |

SUFFIX (9 BITS) MAXIMUM 512

| OBJECT MAIL ADDRESS: | abc@canon.ne.jp |
| PASSWORD: | **** |

☐ PRINT IMAGE WHEN MAIL HAS ATTACHED IMAGE
☐ PRINT WORDPROCESSOR DOCUMENT IF ATTACHED IN MAIL
☐ PRINT MAIL SENTENCE THAT CANNOT BE FULLY DISPLAYED ON MAIL TERMINAL
☐ NOTIFY THAT MAIL TO BE PRINTED HAS ARRIVED

[ OK ]   [ CANCEL ]

P-CODE SERVICE

PLEASE SELECT METHOD OF INPUTTING P-CODE

| INPUT BY TOUCH PANEL | — 9502 |
| INPUT FROM CELLULAR PHONE | — 9503 |
| HANDY SCANNER INPUT | — 9504 |

| PLEASE PRESS HERE FOR TRANSMISSION OF DATA | — 9505 |

MAIL BOX HAS FOLLOWING MAILS

| PRINT ALL (10302) | DISPLAY PREVIOUS LIST (10303) | DISPLAY NEXT LIST (10304) |

| SURFIX | SUBJECT (CONTENTS) | FROM (SENDER) | NUMBER OF PAGES | PRINT | | |
|---|---|---|---|---|---|---|
| | | | | COLOR (10305a) | BLACK AND WHITE (10305b) | NOT PRINT (10305c) |
| #1 | NEW YEAR PARTY | takaha@ces.canon | 1 | COLOR | BLACK AND WHITE | NOT PRINT |
| #2 | SENDING DB EXAMINATION MEETING MINUTES | itoh@cci.dumnt | 2 | COLOR | BLACK AND WHITE | NOT PRINT |
| #3 | RE:DO YOU KNOW ? | nishida@ykk.com | 1 | COLOR | BLACK AND WHITE | NOT PRINT |

10305

NUMBER OF SELECTED MAILS IS TWO   NUMBER OF PRINT PAGES IS THREE — 10306

| PRINT PREVIEW (10307) | SET OPTION (10308) | PRINT (10309) | RETURN (10310) | CANCEL (10311) |

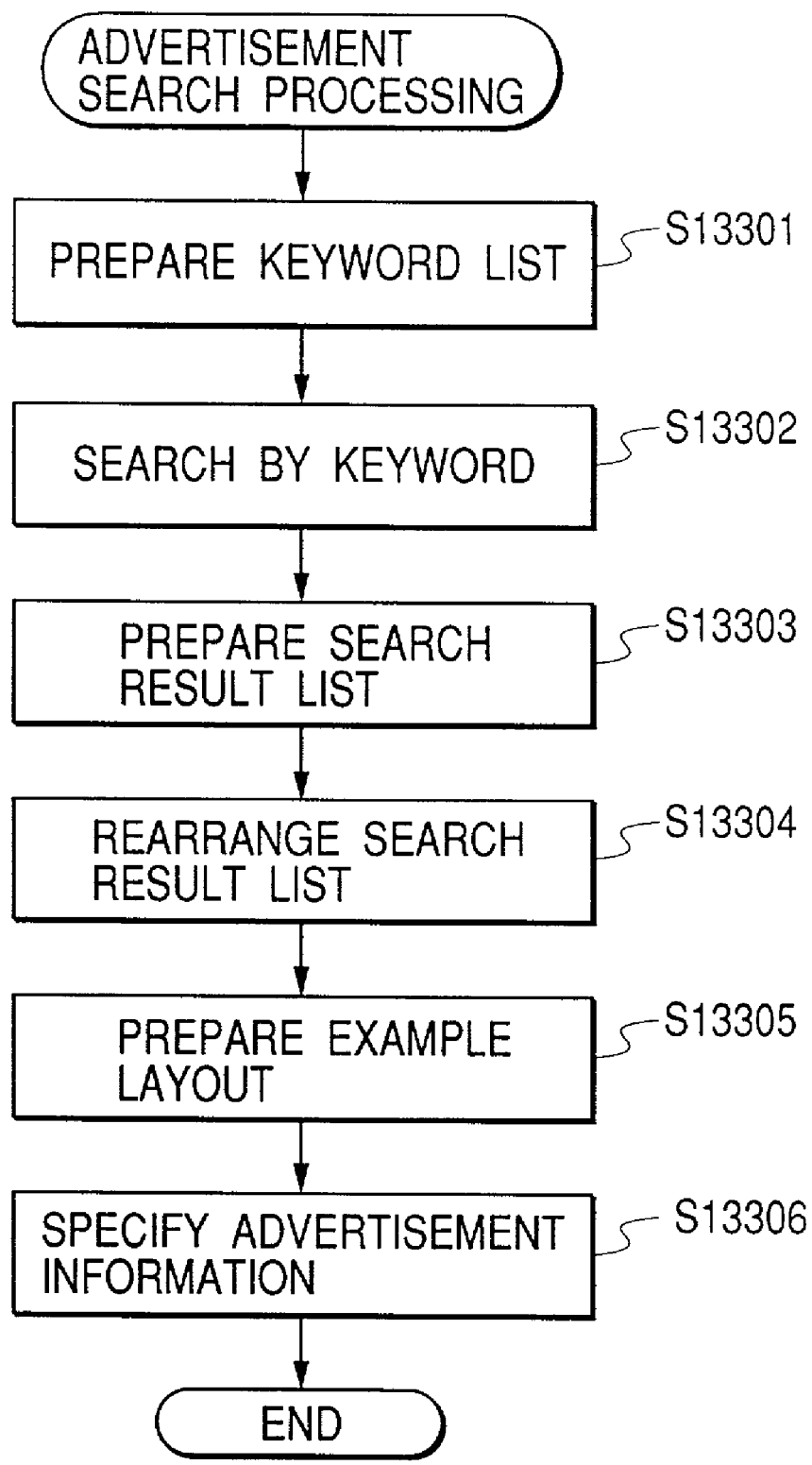

SYSTEM FOR PROVIDING ELECTRONIC MAIL AND DEVICE AS WELL AS THE METHOD, PROGRAM AND STORAGE MEDIUM FOR SAME

BACKGROUND OF THE INVENTION

1. Field of the Invention

The present invention relates to an information providing system and device for providing information to users using an electronic mailing system, and a method thereof, a program for the method and a storage medium storing the program.

2. Related Background Art

In recent years, an information providing service utilizing the Internet has become available by the development of a communication infrastructure and an information communication technology. The information providing service utilizing the Internet can provide not only information by means of characters but also multimedia information including images, sounds or the like.

In addition, a user can communicate and exchange information using electronic mails with other users by registering a mail account for using electronic mails.

Although electronic mail information is usually in a text format, a binary file such as application data (a document file) prepared by a user can also be transmitted and received among users as an attachment to the electronic mail information by the technologies for encoding binary data into text data and decoding text data into binary data.

On the other hand, because of the development of a wireless communication infrastructure and an information communication technology therefor as well as the advancement of miniaturization of a terminal for utilizing them, connection to the Internet has become possible not only from a desktop personal computer but also from a portable terminal for a mobile environment such as a cellular phone. As a result, the number of users who send electronic mails using portable terminals is increasing rapidly.

Means for obtaining information circulating over the Internet is no longer limited to a personal computer but are now available in huge variety such as a portable terminal and an electronic mail dedicated terminal. There are a variety of physical limitations and capability limitations peculiar to each of such means, for example a limitation on an amount of information that can be received, a limitation on displaying capability (size, color, resolution or the like) of terminals or the like. In addition, even in communication and exchanges of electronic mails between personal computers that have fewer limitations on displaying capability compared with portable terminals, both a sender and a receiver of information often lack a common information processing environment.

Under such an environment, unless both the users understand each other's environment in advance and exchanges information in the manner matching the other's environment, information that cannot be handled is discarded as it is.

For example, in a portable terminal such as a cellular phone, limitations are set on a number of receivable characters for one mail and information contents (attached files) that can be handled in the case in which electronic mails are exchanged via the Internet. If a receiver utilizes such a portable terminal, information that cannot be handled by the portable terminal (characters exceeding the number of characters allowed for one mail and an attached file that cannot be handled) is discarded in the portable terminal as it is or discarded on a server side.

If a destination user utilizes a mail address provided by a portable telephone carrier, it can be imagined from its domain name that the destination user uses a cellular phone. However, not all users of portable terminals utilize such mail addresses. In general, even a user of a portable terminal utilizes a standard address system of an Internet mail. Moreover, some users of portable terminals transfer mail addresses that are utilized in terminals, such as desktop personal computers, with different limitations on receipts of electronic mails to mail addresses of portable terminals. Thus, the user on a transmitting side cannot easily determine the information receiving capability of a receiver terminal. As a result, it is also extremely hard for a sender of an electronic mail to estimate an environment of a receiver to process the mail into a format compatible with the receiver's environment and send it to the receiver.

Therefore, there are frequent occurrences of mails lacking the information in the exchanges of electronic mails through portable terminals.

If a capacity of information that is receivable from a WWW (World Wide Web) server is larger than a limitation on the number of characters receivable from an electronic mail server, a user sets environment such that an electronic mail to a portable terminal is transferred to an account of the user on the WWW server from the electronic mail server before it is received in a portable terminal and the electronic mail is viewed through the WWW server, whereby the receivable number of characters in the electronic mail can be increased. However, this merely avoids the limitation on the receivable number of characters in a portable terminal, but cannot handle viewing of a binary file and data acquisition, and further unconditionally transfers an electronic mail to a portable terminal. Thus, a user of a portable terminal always has to confirm if a mail has been transferred to the WWW server, which causes significant load to the user of the portable terminal.

In addition, it is not practical, due to limitations on a displaying capability, processing capability or the like of a portable terminal, for a sender of an electronic mail to attach a document file or the like prepared by using an application if only the portable terminal is utilized as connecting means to the Internet.

Moreover, even in receiving means such as a desktop personal computer besides a portable terminal, which is an Internet connection terminal having fewer limitations, requires an application that is used when a sender of the electronic mail prepared an attached document or an application having compatibility with the application in order to develop and display the document to be attached to the electronic mail. However, such applications do not always exist in an electronic mail receiving terminal. In this case, an electronic mail receiver cannot easily see information sent by the electronic mail sender.

Under such an environment, unless a receiver prepares an environment that is compatible with a transmission environment of a sender by consuming a significant amount of labor, information sent from the sender cannot be confirmed.

SUMMARY OF THE INVENTION

In order to solve the above-mentioned problems, the present invention provides an information providing system comprising: receiving means for receiving electronic mail information; first determining means for determining whether or not the electronic mail information can be outputted in a destination of the electronic mail information; issuing means for issuing code information for outputting the electronic mail information in another terminal if it is determined by the first determining means that the electronic mail information cannot be outputted in the destination; and notifying means for notifying the destination of the code information issued by the issuing means.

In addition, the present invention provides an information providing device comprising: receiving means for receiving electronic mail information that is determined to be unable to be outputted in a destination of the electronic mail information; determining means for determining whether or not the electronic mail information received by the receiving means can be outputted in another terminal; issuing means for issuing code information for the electronic mail information that is determined by the determining means to be able to be outputted; and notifying means for notifying the destination of the code information issued by the issuing means.

In addition, the present invention provides an information providing device comprising: receiving means for receiving electronic mail information; determining means for determining whether or not the electronic mail information can be outputted in a destination of the electronic mail information; code information receiving means for receiving code information for outputting in another terminal the electronic mail information that is determined by the determining means to be unable to be outputted; and notifying means for notifying the destination of the code information received by the code information receiving means.

In addition, the present invention provides an information providing method comprising: a receiving step for receiving electronic mail information; a first determining step for determining whether or not the electronic mail information can be outputted in a destination of the electronic mail information; an issuing step for issuing code information for outputting the electronic mail information in another terminal if it is determined by the first determining step that the electronic mail information cannot be outputted in the destination; and a notifying step for notifying the destination of the code information issued by the issuing step.

In addition, the present invention provides an information providing method comprising: a receiving step for receiving electronic mail information that is determined to be unable to be outputted in a destination of the electronic mail information; a determining step for determining whether or not the electronic mail information received by the receiving step can be outputted in another terminal; an issuing step for issuing code information for the electronic mail information that is determined by the determining step to be able to be outputted; and a notifying step for notifying the destination of the code information issued by the issuing step.

In addition, the present invention provides an information providing method comprising: a receiving step for receiving electronic mail information; a determining step for determining whether or not the electronic mail information can be outputted in a destination of the electronic mail information; a code information receiving step for receiving code information for outputting in another terminal the electronic mail information that is determined by the determining step to be unable to be outputted; and a notifying step for notifying the destination of the code information received by the code information receiving step.

In addition, the present invention provides a program executable by a computer comprising: a program code of a receiving step for receiving electronic mail information; a program code of a first determining step for determining whether or not the electronic mail information can be outputted in a destination of the electronic mail information; a program code of an issuing step for issuing code information for outputting the electronic mail information in another terminal if it is determined by the first determining step that the electronic mail information cannot be outputted; and a program code of a notifying step for notifying the destination of the code information issued by the issuing step.

In addition, the present invention provides a program executable by a computer comprising: a program code of a receiving step for receiving electronic mail information that is determined to be unable to be outputted in a destination of the electronic mail information; a program code of a determining step for determining whether or not the electronic mail information received by the receiving step can be outputted in another terminal; a program code of an issuing step for issuing code information for the electronic mail information that is determined by the determining step to be able to be outputted; and a program code of a notifying step for notifying the destination of the code information issued by the issuing step.

In addition, the present invention provides a program executable by a computer comprising: a program code of a receiving step for receiving electronic mail information; a program code of a determining step for determining whether or not the electronic mail information can be outputted in a destination of the electronic mail information; a program code of a code information receiving step for receiving code information for outputting in another terminal the electronic mail information that is determined by the determining step to be unable to be outputted; and a program code of a notifying step for notifying the destination of the code information received by the code information receiving step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 illustrates an example of a data configuration of an IP information registration table;

FIG. 8 illustrates an example of a data configuration of an advertisement information table;

FIG. 9, composed of FIGS. 9A, 9B and 9C, illustrates an example of a data configuration of a user information table;

FIG. 10 illustrates an example of a data configuration of a P code table for a mailing service;

FIG. 11 illustrates an example of a data configuration of a P code table for a distribution service;

FIG. 12 illustrates an example data configuration of a P code table for a receiving service;

FIG. 13 illustrates an example of a data configuration of a P code table for a personal information service;

FIG. 14 illustrates an example of a data configuration of a personal information table;

FIG. 15 illustrates an example of a data configuration of an owner information table;

FIG. 16 illustrates an example of a data configuration of a terminal information table;

FIG. 20 is a dialog box for setting information for a mailing service in registering user information;

FIG. 28 illustrates an example of a display screen shown on a touch panel 204 of the P service terminal 200;

FIG. 29 illustrates an example of a display screen shown on the P service terminal 200 in the case in which a P code for a mailing service is inputted;

FIG. 36 is a flow chart of advertisement search processing.

DETAILED DESCRIPTION OF THE PREFERRED EMBODIMENTS

Preferred embodiments of the present invention will be hereinafter described with reference to the drawings.

<System Configuration>

A service system to be described in this embodiment (hereinafter referred to as a P service system) has a plurality of service terminals (hereinafter referred to as P service terminals) installed in shops, stations or the like and a dedicated service server (hereinafter referred to as a P service server) connected to the service terminals. With the P service system, a user obtains corresponding information from information saved in a P service terminal or obtains corresponding information from the P service server to obtain a print of necessary information by inputting a code of a predetermined form (hereinafter referred to as a P code) from the P service terminal. Further, designation of the P code to the P service terminal can be performed by an unspecified user.

Figure 1:
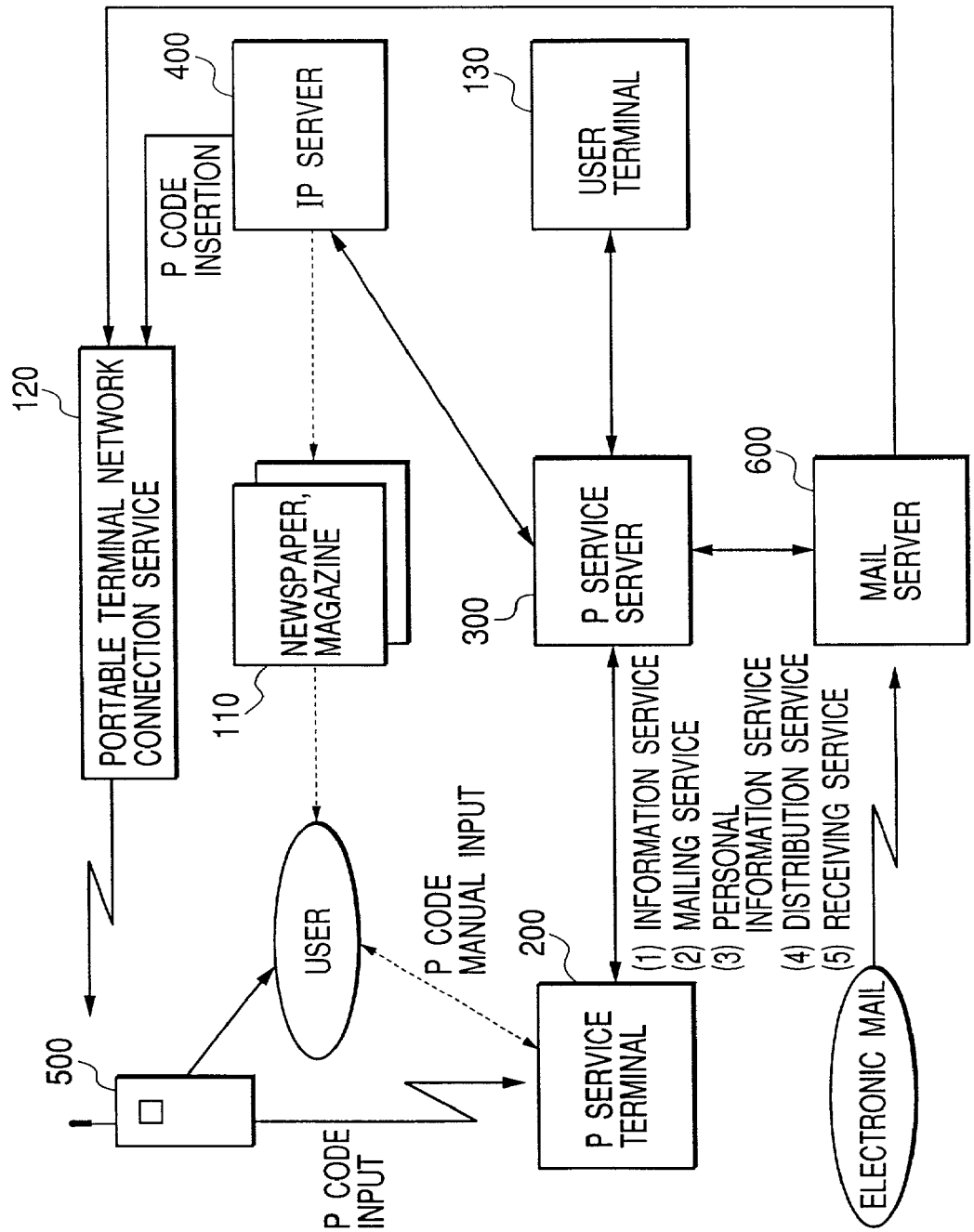
FIG. 1 is a diagram illustrating a schematic configuration of a P service system according to this embodiment.

FIG. 1 is a diagram illustrating a schematic configuration of the P service system according to this embodiment. In FIG. 1, reference numeral 200 denotes a P service terminal and 300 denotes a P service server. The P service server 200 communicates with the P service server 300 and obtains information corresponding to the P code inputted by a user to print the information. In addition, if information corresponding to the inputted P code has been transferred to the P service terminal 200, the P service terminal 200 prints the information. Alternatively, the P service terminal 200 can uploads image information or the like inputted in the P service terminal 200 to the P service server 300. Moreover, the P service system has a function of, if the P service terminal 200 to perform printing is designated, transferring information from the P service server 300 to the P service terminal 200 in advance and automatically notifying a user to the effect that the information has been transferred using an electronic mail or the like.

Further, the P service terminal 200 can be a terminal that is installed in such a manner that the general public can use it in a shop, on a street, in a public facility or the like.

The P service server 300 issues P codes with respect to provided information, and registers them in a P code database to manage them. Then, the P service server 300 obtains information corresponding to a P code inputted from the P service terminal 200 and generates print data to output it to the P service terminal 200. In addition, the P service server 300 has a function of, for print information whose printing terminal is designated, transferring print data to the designated P service terminal 200 in advance before a P code is inputted from the P service terminal 200.

Reference numeral 400 denotes a server for an information provider (hereinafter referred to as an IP server), for example, a general Internet provider. In response to an information request from the P service server 300, the IP server 400 transmits information (contents) corresponding to the P code attached to the information request to the P service server 300. In addition, as described later, the P service server 300 sets a plurality of usable P codes for the IP server 400. The IP server 400 can independently issue a P code to information provided from a user terminal within the range of the usable P codes.

Here, FIG. 1 shows a system in which the P service server 300 and the IP server 400 functions independently and transmission and receipt of information are made possible by a communication network. However, system may be such that the P service server 300 contain the IP server 400 and the function of an IP server is realized by the P service server 300.

If a P code of information managed on the IP server 400 side is inputted from the P server terminal 200, the P service server 300 identifies a corresponding IP server from the P code and transmits the P code to the IP server to request information.

Reference numeral 500 denotes a portable terminal, for example, a cellular phone. The IP server 400 inserts a P code notified by the P service server 300 at the time of registering information in a medium 110 such as a newspaper and a magazine, or writes the P code in mail information to be transmitted to the portable terminal 500 of a user using a cellular phone mailing service provided from a cellular phone network connection service 120, thereby notifying a P service terminal user (hereinafter referred to simply as a user) of the P code. The user inputs the P code attached to information the user is interested in or the P code written in the electronic mail notified via the cellular phone mailing service by using the P service terminal 200, thereby being able to obtain a print of information corresponding to the inputted P code. Further, the portable terminal 500 of this embodiment can extract a P code written in mail information to hold it in an internal memory in advance and input the held P code in the P service terminal 200 by infrared communication or the like.

In addition, the portable terminal 500 can receive a service such as a mailing service by performing individual registration in the P service server 300. This registration can be performed from, for example, a terminal owned by a user (a user terminal 130) via the Web. Alternatively, the registration may be performed by a user writing predetermined items in a registration sheet and an operator of the P service server 300 performing registration processing in accordance with the written contents.

In addition, reference numeral 600 denotes a mail server. It determines whether or not an electronic mail arriving at the mail server 600 in this embodiment can be displayed on an apparatus (portable terminal) of a receiving user. Then, the electronic mail is classified in such a way that, if it is determined that the electronic mail can be displayed, it is sent to the portable terminal 500 through the portable terminal network connection service 120 and, if it is determined that the electronic mail cannot be displayed on the device of the receiving user, it is sent to the P service server 300. If it is determined that the electronic mail cannot be displayed on the apparatus of the receiving user and the electronic mail is sent to the P service server 300, a notification electronic mail including a P code corresponding to the sent electronic mail is sent from the P service server 300 to the mail server 600 anew, and the notification electronic mail is sent to the portable terminal 500 via the portable terminal network connection service 120.

In this embodiment, there are two types of information that are provided by the IP server 400 and registered and managed by the P service server 300. One is information provided to a user with or without charge based on a P code designation by a user from the P service terminal 200 or the like (hereinafter referred to as IP information), and the other is information automatically selected by the P service server 300 and added to the information obtained in response to the input of the P code by the user (IP information or the like) (hereinafter referred to as advertisement information).

As an example of a service to be realized in the above-mentioned P service system, the following services are mainly described in this embodiment.

(1) User registration: A P code for an individual is given in response to a registration application to the P service server 300 from the user terminal 130, the P service terminal 200 or the like.

(2) IP information registration: IP information is registered in the P service server 300 (or the IP server 400) in response to a registration application of the IP information and a P code for the IP is given.

(3) Advertisement information registration: Advertisement information is registered in the P service server 300 (or the IP server 400) in response to a registration application of the advertisement information.

(4) Information service: A P code (P code for the IP) of desired information is inputted from the P service terminal 200, whereby a print output of the desired information is obtained.

(5) Mailing service: A P code (P code for an individual) of a user is inputted from the P service terminal 200, whereby a print output of information with contents that cannot be received by the portable terminal 500 among mails addressed to the user is performed.

(6) Personal information service: A P code of a user is inputted from the P service terminal 200, whereby a print output of information that is set and registered with respect to the user in advance is obtained.

(7) Distribution service: Desired information is uploaded to the P service server 300 from the P service terminal 200 in advance and is printed and outputted by the P service terminal 200 if necessary.

(8) Receiving service: Information uploaded by a third party from the P service terminal 200 is stored in the P service server 300 and is printed and outputted by the P service terminal 200 if necessary.

Further, services and functions realized by the P service system in this embodiment are not limited to the above.

<Configuration of the P Service Terminal>

Figure 2:
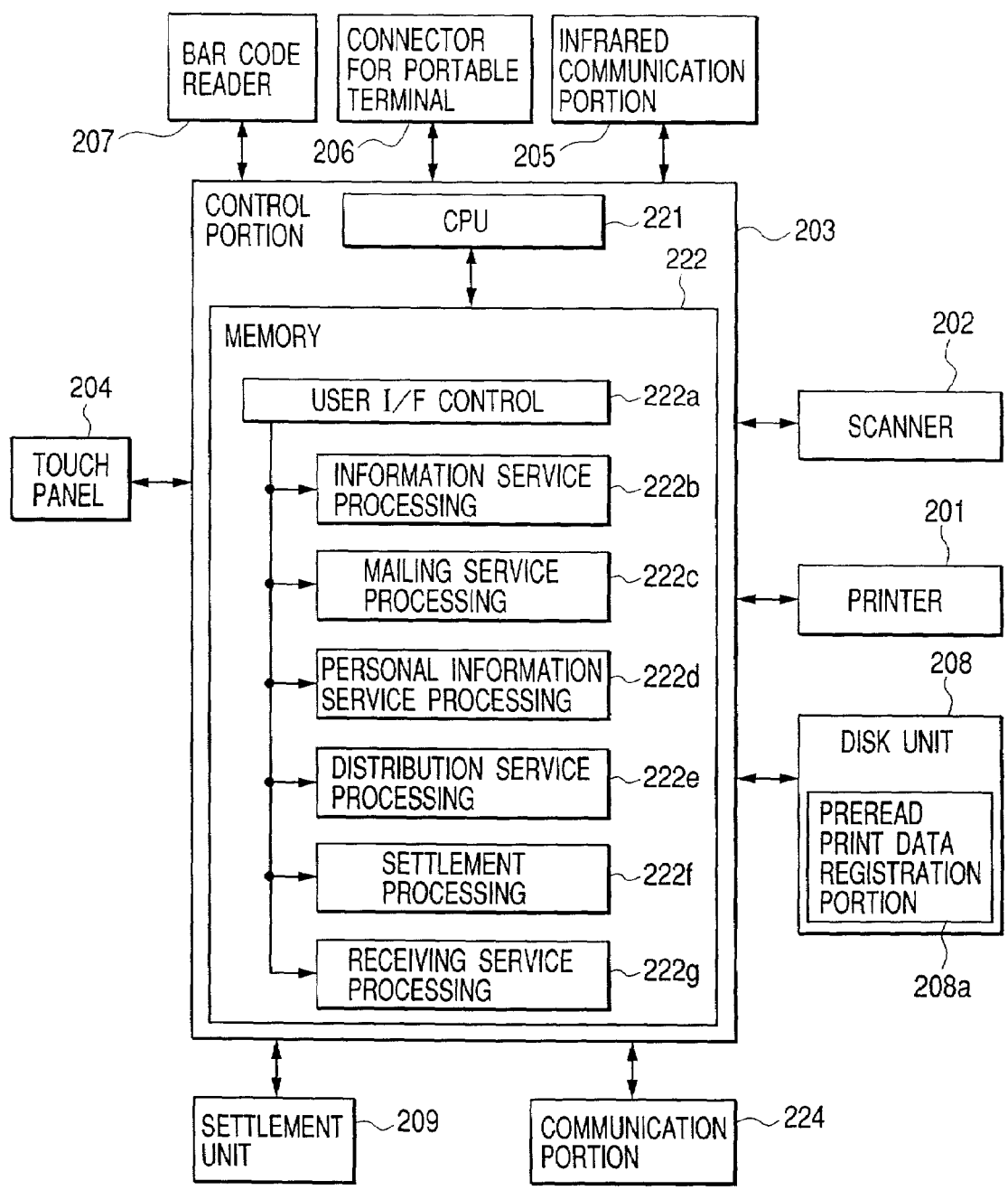
FIG. 2A is a block diagram showing a configuration for controlling a P service terminal 200.
FIG. 2B illustrates an example of a data configuration of a local information table on the P service terminal.

FIG. 2A is a block diagram showing a configuration of the P service terminal 200 according to this embodiment. In FIG. 2A, reference numeral 201 denotes a printer, which, for example, forms a color visual image in a laser beam method. Reference numeral 202 denotes a scanner, which optically reads an original image to convert it to digital image data. Further, a recording method of the printer 201 is not limited to the laser beam method and may be any method such as a thermal transfer method and an ink-jet recording method. In addition, The P service terminal 200 may be adapted to function as a copying machine by the printer 201 and the scanner 202. Reference numeral 203 denotes a main unit, which performs a communication control with the P service server 300, a communication control with the portable terminal 500, a various operations input control and a display control corresponding to various operations.

Reference numeral 204 denotes a touch panel, which allows a user to input operations and shows various kinds of information to a user. Reference numeral 205 denotes an infrared ray receiving portion, which is used to receive a P code by infrared communication by a portable terminal provided with an infrared communication function. Reference numeral 206 denotes a connector for a portable terminal. When a portable terminal is connected to the connector, data (P code) stored in a memory of the portable terminal is read by the P service terminal 200. Reference numeral 207 denotes a bar code reader, which reads and obtains a P code when the P code is provided using a bar code.

Reference numeral 208 denotes a disk unit, which writes and reads data to and from a floppy disk, an MO or the like. In addition, a hard disk for saving print data that is sent by the P service server 300 in advance and a table for managing information for the print data is also included in the disk unit 208. Reference numeral 209 denotes a settlement unit, which performs settlement with respect to the above-mentioned various services. As a method of settlement, various methods are possible such as settlement by cash and settlement by a credit card.

Reference numeral 224 denotes a communication portion, which performs communication connection with the P service server 300 via a telephone line or the like.

In the main unit control portion 203, reference numeral 221 denotes a CPU, which realizes various controls in the P service terminal 200 in accordance with a control program stored in a memory 222. A user I/F control 222a controls execution of the following each program among control programs to be stored in the memory 222 according to an operation instruction by a user via the touch panel 204. Information service processing 222b, mailing service processing 222c, personal information service processing 222d, distribution service processing 222e and receiving service processing 222g realize various services mentioned above such as the above-mentioned information service, mailing service, personal information service, distribution service and receiving service, respectively. Settlement processing 222f realizes settlement processing using the settlement unit 209. A preread print data registration portion 208a (hard disk) for temporarily saving print data to be sent from the P service server 300 in advance and saving a table (FIG. 2B) for managing the print data currently saved in the P service terminal 200 is also included in the disk unit 208.

FIG. 2B illustrates a table for managing printing data to be saved in the disk unit 208 in the P service terminal 200. The printing data is saved associated with P codes, and a term of data validity for which print data is saved in the P service terminal 200, a printing data file name, a printing status, a data deletion notifying flag and a destination for notifying data deletion are set for each P code.

<Configuration of the P Service Server>

Figure 3:
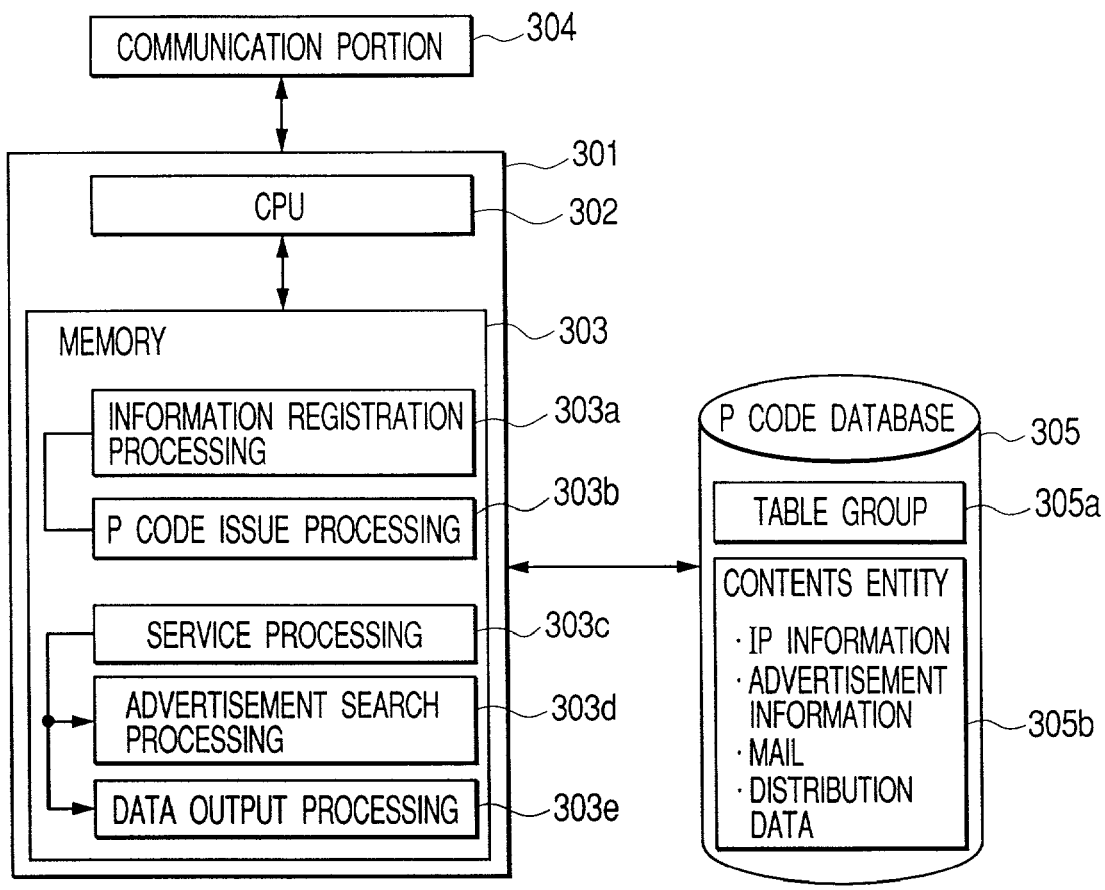
FIG. 3 is a block diagram showing a schematic configuration of a P service server 300.

The P service server 300 will now be described. FIG. 3 is a block diagram showing a schematic configuration of the P service server 300. Reference numeral 301 denotes a control unit, which is provided with a CPU 302 and a memory 303. The CPU 302 realizes various services in the P service server 300 in accordance with a control program stored in the memory 303. A control program to be executed by the CPU 302 is stored in the memory 303. Information registration processing 303a is a program module for performing registration of, for example, IP information, advertisement information, user information (personal information), distribution data for distribution service and receiving service. In addition, P code issue processing 303b is a program module for assigning a P code for specifying each of registered information. Service processing 303c obtains IP information, advertisement information, mail data and distribution data or performs registration of distribution data according to a P code transmitted from the P service terminal 200. Advertisement search processing 303d searches advertisement information that should be added in print output in the P service terminal. By adding advertisement information in this way, an information output fee is covered by an advertisement fee, whereby charges born by a user at the time of information output (at the time of printing) are reduced. Reference numeral 303e denotes data output processing, which adds advertisement information obtained by the advertisement search processing to information obtained based on a P code inputted from the P service terminal 200 to perform layout on a print sheet, and generates print data to output it.

Reference numeral 304 is a communication portion, which is used for connecting with the P service terminal via a line or for connecting with each IP server 400 or the mail server 600 via the Web.

Reference numeral 305 is a P code database, which stores a table group 305a for a P code and an entity of contents 305b. The table group 305a includes an IP information registration table 311 (FIG. 7), an advertisement information table 312 (FIG. 8), a user information table 313 (FIGS. 9A, 9B and 9C), a P code table for mailing service 314 (FIG. 10), a P code table for distribution service 315 (FIG. 11), a P code table for receiving service 316 (FIG. 12), a P code table for personal information service 317 (FIG. 13), a personal information table 318 (FIG. 14), an owner information table 319 (FIG. 15) and a terminal information table 320 (FIG. 16).

FIG. 7 illustrates an example of a data configuration of the IP information registration table 311. The IP information registration table 311 is generated and recorded at the time of registration of IP information. An identification portion, a basic property and an entity information are registered with respect to an assigned P code in the IP information registration table 311. The identification portion stores information for representing a structure of the P code (whether there is a sub-code or not and, if it is linked to another P code, a P code of the linked destination). In the case of a P code having a sub-code, a P code with a plurality of kinds of sub-codes can be registered in the P code, and each sub-code table has an identification portion, a basic property and an entity information similar to those of an IP information registration table. The basic property stores information representing an owner of the IP information and terms and conditions for inserting articles. In addition, the basic property includes "a keyword list" and "a keyword weighted list", which are utilized by the advertisement search processing 303d. The entity file information specifies entity data of the IP information and includes a pass name and a file name of the entity file.

Further, in the P service system of this embodiment, it is possible to issue a P code within an allowed range in the IP server 400. Therefore, registration of IP information is performed by the P service server 300 in some cases and is performed by the IP server 400 in other cases. A server that has performed the registration of the IP information owns its contents and the above-mentioned IP information registration table. That is, among the entities of the IP information and the IP information registration tables, some exist in the P service server 300 while others exist in the IP server 400.

FIG. 8 illustrates an example of a data configuration of the advertisement information table 312. The advertisement information table is generated and recorded when an advertiser registers advertisement information. An advertisement property, a link and entity file information of the advertisement information are stored for an assigned P code in the advertisement information table 312. Information indicating an owner of the advertisement information and terms and conditions for inserting the advertisement information are registered in the advertisement property. Further, a target keyword list and a target keyword weighted list to be utilized in the advertisement search processing 303d are stored in "information of a link to IP information" of the advertisement property.

A P code of other advertisement information to which the advertisement information should be linked is stored in the link. In addition, a pass name and a file name for specifying a file of the advertisement information are registered in the entity file information. Further, although the entity of the advertisement information may be in either the P service server 300 or the IP server 400, the advertisement information table 312 is always stored in the P code database 305 of the P service server 300. Further, it is needless to mention that, if the entity of the advertisement information is in the IP server 400, the entity file information of the advertisement information table 312 includes information for specifying the IP server 400 (an IP server is specified by a P code in this embodiment, which will be described later).

FIGS. 9A to 9C illustrate an example of a data configuration of the user information table 313. The user information table 313 is generated and recorded when a user performs member registration of a P service system, and includes a user profile, individual information, information for a mailing service, information for a distribution service and information for a personal information service. Information representing an address and interests and hobbies of the user is registered in the user profile. An address, a name, a telephone number, a credit card number of the like of the user as shown in FIG. 14, and a pointer to an individual information table in which secret information of an individual is registered are stored in "a individual information table" in the user profile. Information required in a mail printer service, a distribution service and a personal information service is registered in information for a mailing service, information for a distribution service and information for a personal information service, respectively.

FIG. 10 illustrates an example of a data configuration of the P code table for a mailing service 314. As shown in the figure, "a mail property" representing a subject (title) and a sender of a mail, "a notified information property" including a notification flag for notifying a terminal ID of a terminal to which data is sent in advance and deletion of print information, and entity file information indicating a file of mail data are registered with respect to a P code for a mailing service.

FIG. 11 illustrates an example of a data configuration of the P code table for a distribution service 315. As shown in the figure, "distribution information property" representing a title the term of validity of the distributed information and a code number given to the distribution information and entity file information indicating the distribution information file are registered with respect to a P code for a distribution service.

FIG. 12 illustrates an example of a data configuration of the P code table for a receiving service 316. As shown in the figure, "a received information property" representing a P code/telephone number of a registrant of data, a title, an information registration date, a term of information validity and a code number required for registration, "a notified information property" including a printing status for determining whether or not a notification flag or information for notifying a terminal ID of the terminal to which data is sent in advance and deletion of printed information have been printed, and an entity file information indicating a received information file are registered for a P code for a receiving service.

FIG. 13 illustrates an example of a data configuration of the P code table for a personal information service 317. As shown in the figure, "a property for personal information" representing a title and a last printing date and "registered P code information" representing a list of registered P codes are registered for a P code for a personal information service. This P code list is a P code group set and registered in advance by a user.

FIG. 14 illustrates an example of a data configuration of the personal information table 318. The persona 1 information table is included in a user information table as described above with reference to FIGS. 9A to 9C.

FIG. 15 illustrates an example of a data configuration of the owner information table 319. This table is a table linked to "an owner ID" in the IP information registration table shown in FIG. 7 or the advertisement information table shown in FIG. 8. Information on an owner (information provider, advertiser) is registered in the owner information table 319 as shown in FIG. 15.

FIG. 16 illustrates an example of a data configuration of the terminal information table 320. The terminal information table is retained for each of P service terminals.

<Configuration of the IP Server>

Figure 4:
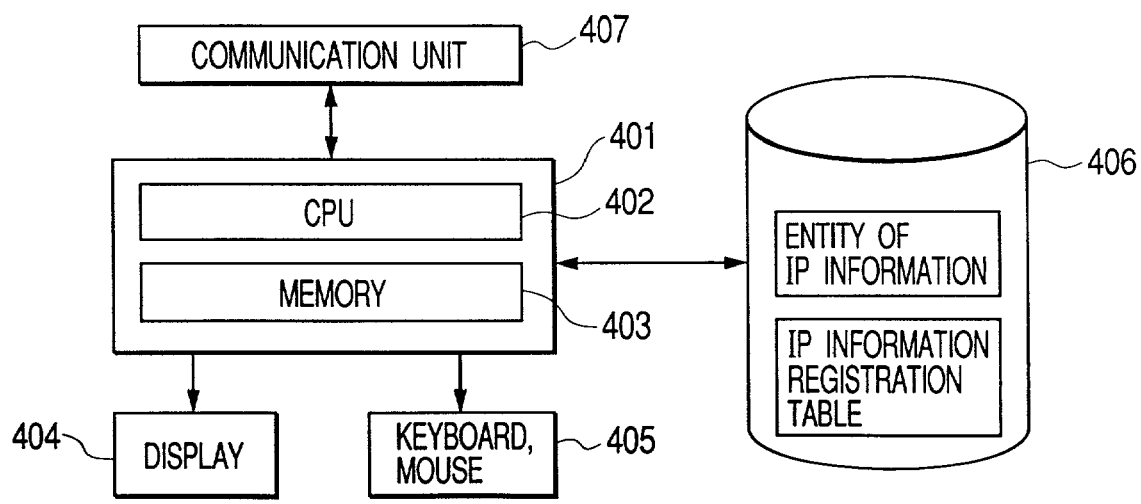
FIG. 4 is a block diagram showing a typical configuration of an IP server 400.

FIG. 4 is a block diagram showing a typical configuration of the IP server 400. In FIG. 4, reference numeral 401 denotes a control portion, which is provided with a CPU 402 and a memory 403 and executes various kinds of processing in the IP server 400. Reference numeral 404 denotes a display, which performs various displays under the control of the control unit 401. Reference numeral 405 denotes an input unit provided with a keyboard or a pointing device such as a mouse. Reference numeral 406 denotes a data storage unit, in which the IP server 400 retains "an entity of IP information" registered in a P service system and "an IP information registration table" for the IP information (the IP information registration table is similar to the one shown in FIG. 7). Reference numeral 407 is a communication unit, which is connected to the P service server 300 via a line or the like.

The IP server 400 obtains a P code value that can be utilized by the P service server 300 and issues a P code at the time of registration of IP information from a user terminal. At this point, the IP server 400 retains an entity of the IP information and the IP information table 311 in the data storage unit 406. In addition, if a request for information is received from the P service server 300, the IP server 400 takes out an entity (contents) of the IP information according to a designated P code and transmits it to the P service server 300.

<Configuration of a Portable Terminal>

Figure 5:
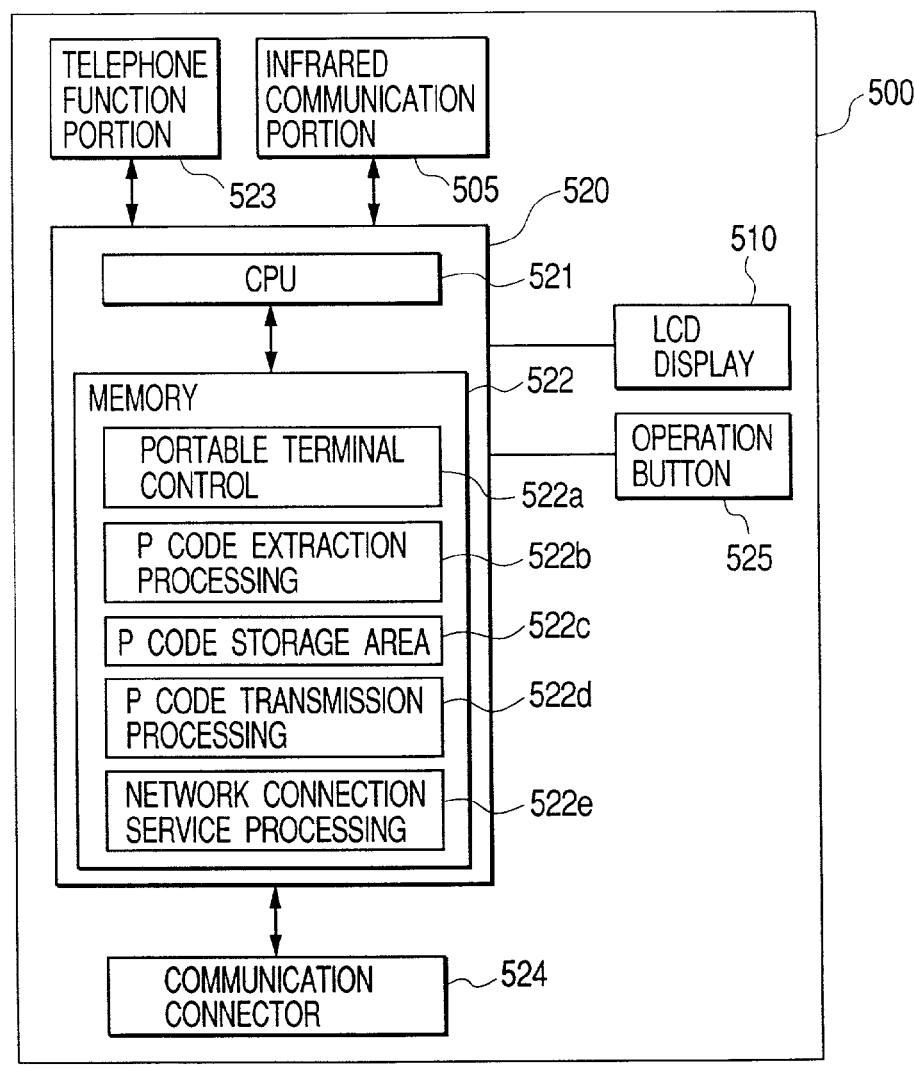
FIG. 5 is a block diagram illustrating a configuration of a portable terminal 500.

FIG. 5 is a block diagram illustrating a configuration of the portable terminal 500. The portable terminal 500 is provided with a liquid crystal display 510 and an operation button 525 (a dial button, a cursor key, an area designation key, a P code key or the like) and functions as a cellular telephone. In addition, the portable terminal 500 can also receive a mail to display its contents on the liquid crystal display 510. In doing so, the portable terminal 500 can cause a cursor in the liquid crystal display to move by the cursor key of the operation button 525 and can select a desired area in the mail in cooperation with the operation of the area designation key. Then, when the P code key is pressed in the state in which a certain area in the mail is being selected, data in the selected area is stored in an internal memory as a P code. Alternatively, the portable terminal 500 may be configured such that it automatically searches and extracts a P code to store the P code in the memory by a user pressing the P code key in the mail display state.

Reference numeral 505 denotes an infrared ray communication portion, which outputs a P code stored in the internal memory by infrared ray. The infrared ray emitted by the infrared ray communication portion 505 is received by the infrared communication portion 205 of the P service terminal 200 and is recognized as the P code. In addition, a communication connector 524 is provided in the portable terminal 500, which can exchange telephone number information with a personal computer. In this embodiment, it is possible to transfer a P code to the P service terminal 200 by connecting the portable terminal 500 to the connector for a portable terminal 206 of the P service terminal 200.

Reference numeral 523 is a telephone function portion, which is provided with functions required for call processing as a cellular phone, such as a speaker, a microphone and a wireless communication function.

Reference numeral 520 denotes a control unit, which realizes a control of each configuration in accordance with a control program stored in a memory 522. Among programs stored in the memory 522, a portable terminal control 522a is a program unit for realizing a function as a normal cellular phone. P code extraction processing 522b is a program unit for processing to extract a P code from a received mail and store the P code in a P code storage area 522c. Further, as described above, as an extracting method of a P code, there are a method of extracting data in an area designated manually as a P code and a method of automatically identifying a P code and extracting it from mail data. In addition, P code transmission processing 522d is a program unit for transmitting a P code stored in the P code storage area 522c to the P service terminal 200 via the infrared communication portion 505 or the communication connector 524. Reference numeral 522e is a network connection service processing unit, which can receive an electronic mail from the portable terminal network connection service 120 by using a communication function of the telephone function portion 523.

<Configuration of a Mail Server>

Figure 6:
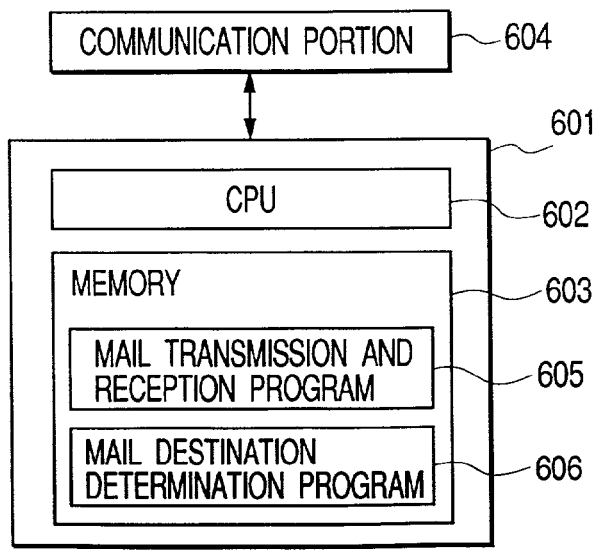
FIG. 6 is a block diagram showing a general view of a mail server 600.

FIG. 6 is a block diagram showing a configuration of the mail server 600. Reference numeral 601 denotes a control unit, which is provided with a CPU 602 and a memory 603. The control unit 601 performs controls of transmission and reception of a mail using a mail transmission and reception program 605 stored in the memory 603. In addition, the control unit 601 determines whether a received electronic mail is sent to the portable terminal 500 or to the P service server 300 using a mail destination determination program 606 stored in the memory 603 and separates received mails accordingly. Reference numeral 604 denotes a communication portion, which is used for exchanging mail data through a line.

<Description of a P Code>

A P code used for specifying information in this embodiment will now be described.

Figure 17C:
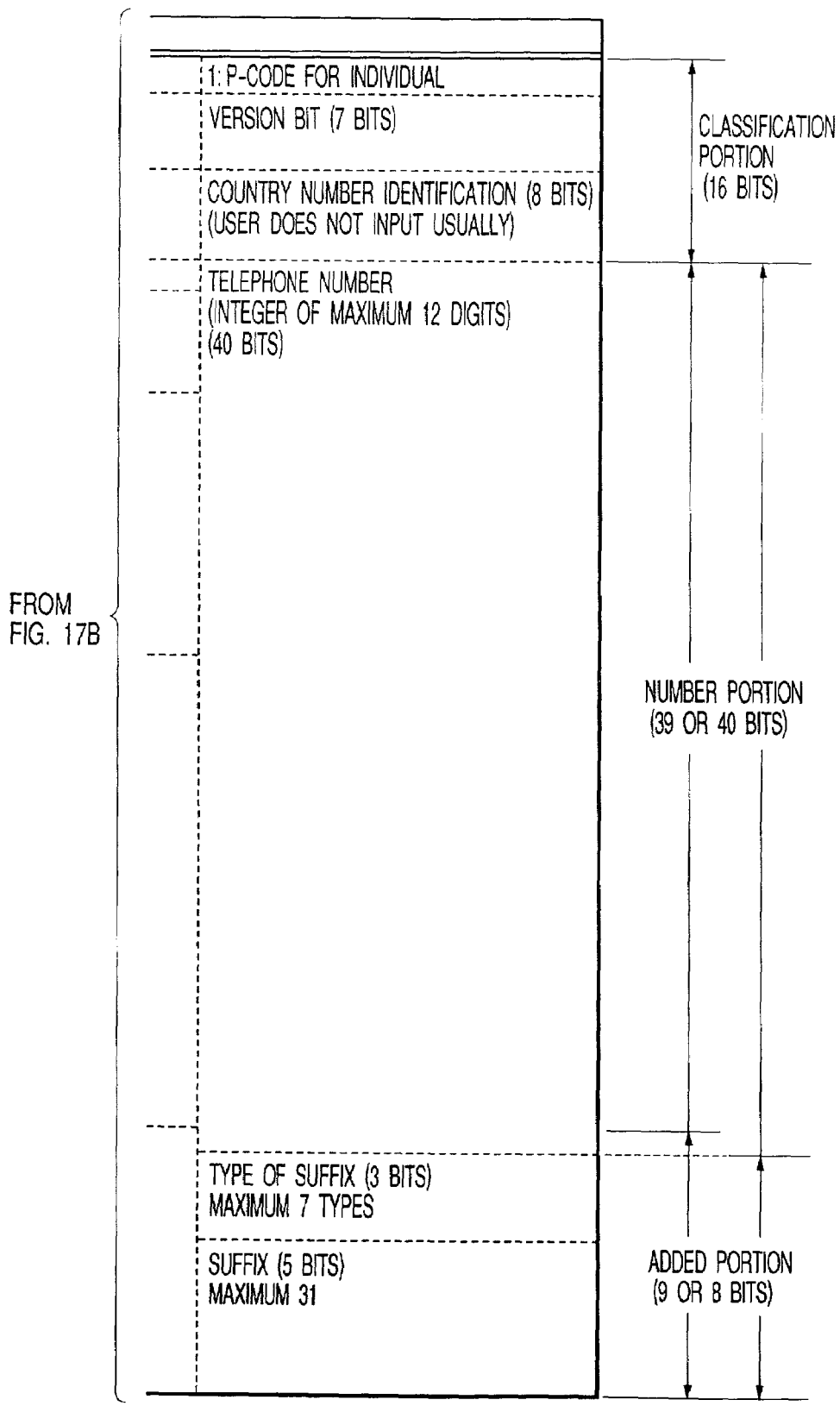
FIG. 17, composed of FIGS. 17A, 17B and 17C, illustrates a data configuration of a P code that is used in a P service system according to this embodiment.

FIGS. 17A, 17B and 17C illustrate a data configuration of a P code that is used in a P service system according to this embodiment. As shown in FIGS. 17A to 17C, the P code can be classified into three parts, namely "a classification portion", "a number portion" and "an added portion".

The classification portion is a 16 bit code including a P code classification bit indicating whether an inputted P code number is a P code for an IP or a P code for an individual, version information and a country number. When a P code number is inputted in the P service terminal 200, contents of this classification portion are automatically added by the P service terminal.

First, it is determined whether an inputted P code is a P code for an individual or a P code for an IP and a P code classification bit is set. In this embodiment, a telephone number is used in a number portion of a P code for an individual. Then, if the number inputted in the P service terminal 200 is a consecutive numeral characters of less than eleven digits, the classification portion determines that a telephone number is inputted, that is, a P code for an individual is inputted, and sets "1" in the P code classification bit. On the other hand, if a digit string partitioned by hyphens for every four digits (for every four numerical characters) is inputted as a P code number, the classification portion determines that it is a non-telephone number (i.e., a P code for an IP) and sets "0" in the P code classification bit. Subsequently, version information is set and a country number representing a country where the P service terminal is installed is set (if a country is designated from a P service terminal, the number of the designated country is set).

The number portion is a number inputted by a user directly (hereinafter referred to as a P code number). Further, a telephone number is used as a P code number of an individual.

Further, when the above-mentioned P code classification bit is 1, that is, the P code is a P code for an individual, forty bits are assigned to the number portion as illustrated in the figure, where a numerical value represented by a telephone number is inputted. Then, the remaining eight bits are used as an added portion.

On the other hand, when a P code classification bit is 0, that is, the P code is a P code for an IP, thirty-nine bits are assigned to the number part as illustrated in the figure and the remaining nine bits are used as the added portion. Then, the upper one bit in the number portion of thirty-nine bits is a P service server identification bit (one bit) and, if it is zero, it represents a P service server, and the subsequent thirty-eight bits are represented as bits for an information ID. If the P service server identification bit is one, it represents an IP server and, the subsequent three bits represent a classification. Thus, the first one digit of a P code number represents a classification (numerical values of 1 to 5). Further, as shown in FIGS. 17A to 17C, in this classification, five classes ranging from an extremely small size to an extremely large size are represented by the numerical values 1 to 5 represented by these three bits. For example, in the case of a class 1 (extremely small size), twenty-four bits are used for a number for identifying a site (hereinafter referred to as an external code), and the remaining eleven bits constitutes a code for an ID that can be utilized in the site freely (hereinafter referred to as an internal code). Further, although the numbers of assigned bits of the number portion and the added portion are different depending on whether a P code is a P code for an individual or a P code for an IP in this embodiment, a method of assigning bits is not limited to this.

The added portion indicates an identification number in the case where contents to be identified by the combination of the above-mentioned classification portion and number portion have further classifications. For example, to name a few, classifications such as "results of today", "results of yesterday" and "results of the day before yesterday" are provided with respect to "results of the professional baseball game", or classifications such as "place where races are held" and "races" are provided with respect to "horse race result prediction". Alternatively, if a P code is a P code for an individual, it is used for a mail box number or a number for personal information.

In particular, in this embodiment, if a grouping is designated for a P code, a plurality of kinds of "added portions" can be connected as a suffix for one number portion. Then, if only a code of the number portion is inputted as a P code and a suffix is not inputted, an added part with a largest suffix value is selected to be presented as IP information. In this way, it is possible to handle information that is required to be updated or added frequently such as "results of the professional baseball matches of yesterday". In this case, results of matches of yesterday are additionally registered associated with a P code with an incremented suffix on the following day of a day when new results of professional baseball matches are generated. Therefore, if a user designates a P code number in order to obtain "results of the professional baseball matches of yesterday", an added portion with a largest suffix to be added to the P code number is taken out to be presented to the user.

Further, if an added portion exists in a P code, although a user can directly input this, the user can also input a P code with an added portion by a menu selection without inputting a number directly. That is, if a user has inputted a P code number only for a P code having an added portion, a value of a pertinent P code (a number portion plus an added portion) and its property (a title or the like) are transmitted from the P service server 300 to the P service terminal 200. The P service terminal 200 displays a selection list indication on the touch panel 204 as a menu using this information. When the user selects desired contents from this selection list, a corresponding P code (a number portion plus an added portion) is transmitted to the P service server, and the selected contents are sent to the P service terminal.

Further, if a P code is stored in a memory of a portable terminal in advance, "a number portion" and "an added portion" are registered in the memory and inputted in a P service terminal, whereby operations such as menu selection can be omitted and burdens on a user can be reduced.

<Outline of Operations of a P Service Server>

Figure 18:
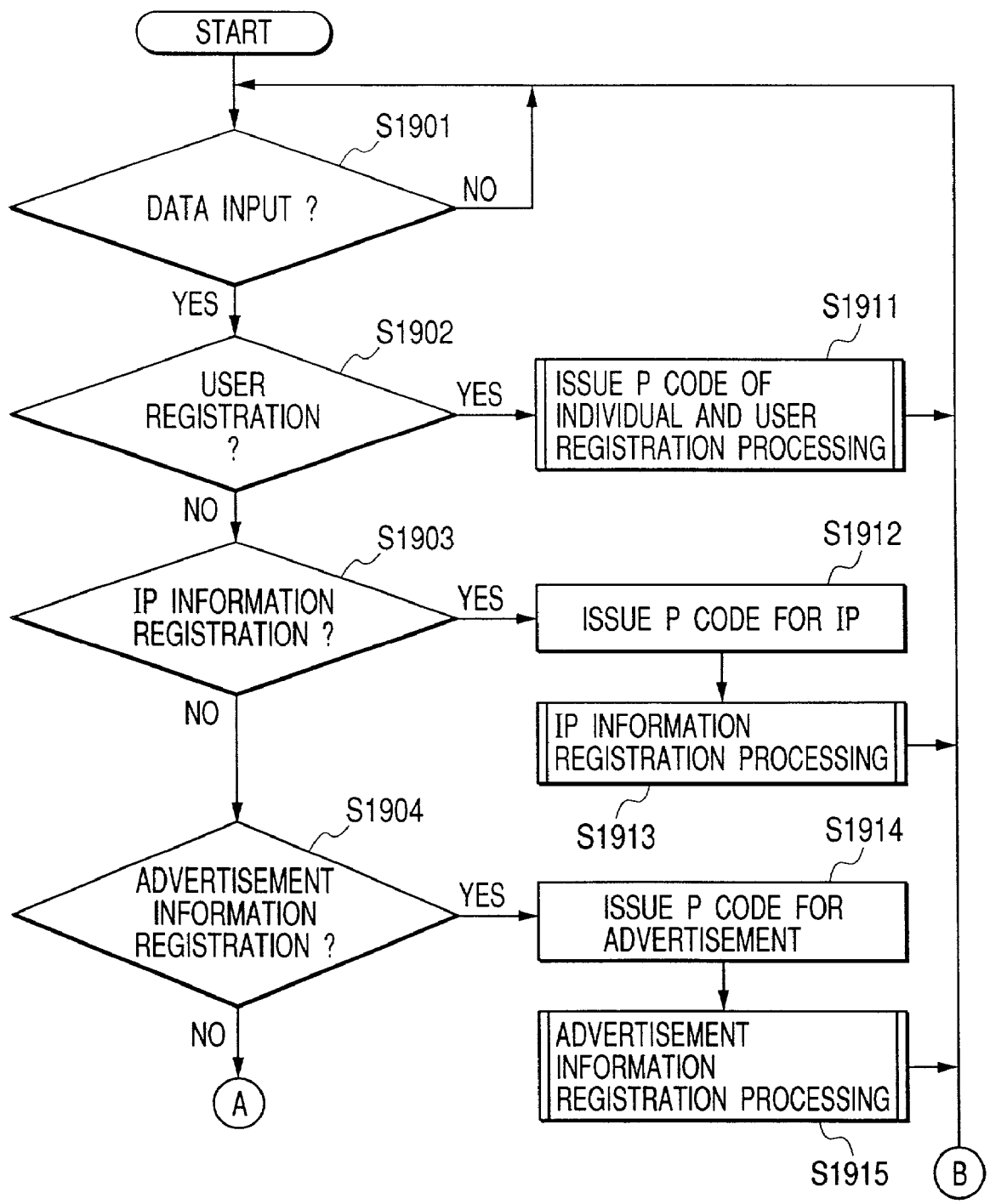
FIG. 18 is a flow chart describing an outline of processing by a P service server of this embodiment.

An outline of processing by a P service server of this embodiment will now be described with reference to FIGS. 18 and 19.

In steps S1901 to S1910, processing that should be executed is selected based on ID information, a command or a P code inputted from the P service terminal 200, the IP server 400, the user terminal 130 or the like.

If the processing that should be executed is a user registration request, the processing advances from step S1902 to step S1911 to issue a P code for an individual by the information registration processing 303a and the P code issue registration 303b and perform the user registration processing. A user information table 313 of FIGS. 9A to 9C and an individual information table 318 of FIG. 14 are generated and registered by this user registration processing. If a user receives a mailing service, a personal information service and a receiving service, the user performs user registration with respect to the P service server 300 in advance. The user can perform user registration from the user terminal 130 or the P service terminal 200. The user interactively inputs information for each item of the user information table 313 of FIGS. 9A to 9C and the individual information table 318 of FIG. 14. A hobby, a genre of interest or the like can be inputted in a user profile in addition to information such as an address and a name, and an advertisement suitable for the interests of the user is searched in step S1923 using this information. In addition, the user can also sets an output format of a layout at the time of print-out (a layout pattern such as "ease of viewing is prioritized" or "the number of pages is prioritized", an amount of advertisement information, a font size, or the like). In addition, when the user registers information for a mailing service in a user information table, a dialog box for setting information for a mailing service as shown in FIG. 20 is displayed. If the user checks a check button of "when a mail has an attached image, print the image", an electronic mail including an attached image among electronic mails sent to an object mailing address is transferred to the P service server 300 from the mail server 600 that performs processing of mails of the object mailing address. If the user checks a check button of "when a mail has a word processor document, print the document", an electronic mail including an attached word processor document among electronic mails sent to the object mailing address is transferred to the P service server 300 from the mail server 600 that performs processing of mails of the object mailing address. In addition, if the user checks a check button of "print a mail sentence that cannot be displayed on a mail terminal", electronic mail data corresponding to it is transferred to the P service server 300 from the mail server 600 that performs processing of mails of the object mailing address. In addition, if the P service server 300 is set to notify transmission, when a mail is transferred, an arrival of an electronic mail that can be printed at the object mail address and an electronic mail in which a P code for printing the information are notified to the user's portable terminal. In addition, a P code of favorite information of the user can be set as information for a personal information service in the user information table 313 to be automatically printed every time information for the P code is updated. In addition, a password can be set for each of receiving boxes of the user as information for a receiving service in the user information table 313, whereby data registration to a receiving box of the user by a third party can be restrained. In addition, secret information such as credit card information is set in the individual information table 318 of FIG. 14.

Returning to FIG. 18, if an IP information registration request is inputted on the other hand, the processing advances from step S1903 to step S1912 to issue a P code for an IP and performs IP information registration processing in step S1913. In this IP information registration processing, the IP information registration table 311 shown in FIG. 7 is generated and registered. The registration of this IP information is performed by an information provider accessing the P service server 300 or the IP server 400 from a not-shown terminal owned or otherwise possessed by the information provider (hereinafter referred to as an information provider terminal) via the Web. In performing this IP information registration, setting of basic properties such as individual information, for example an address of the information provider or the like, whether or not a fee is charged for this IP information, whether or not change of a size is allowable, whether or not automatic addition of an advertisement is permitted, a term of information validity and addition of a genre keyword for search is interactively performed. In addition, a plurality of pieces of IP information can be grouped, and information of the grouping is set as frame information.

Returning to FIG. 18, if an advertisement information registration request is inputted, the processing advances from step S1904 to step S1914, where a P code is issued, and advertisement information registration processing is executed in step S1915. In this advertisement information registration processing, the advertisement information table 312 shown in FIG. 8 is generated and registered in the P service server 300. An advertisement provider accesses the P service server 300 or the IP server 400 from a not-shown terminal owned or otherwise possessed by the advertisement provider (hereinafter referred to as an advertisement provider terminal) via the Web, whereby the registration is performed. As shown in the advertisement information table 312 of FIG. 8, information of an advertisement provider, a term of validity of advertisement insertion, a size, an inserting position, a maximum number of printing, an insertion fee of an advertisement, a keyword to be used in searching an advertisement and the like are set as an advertisement property.

Figure 19:
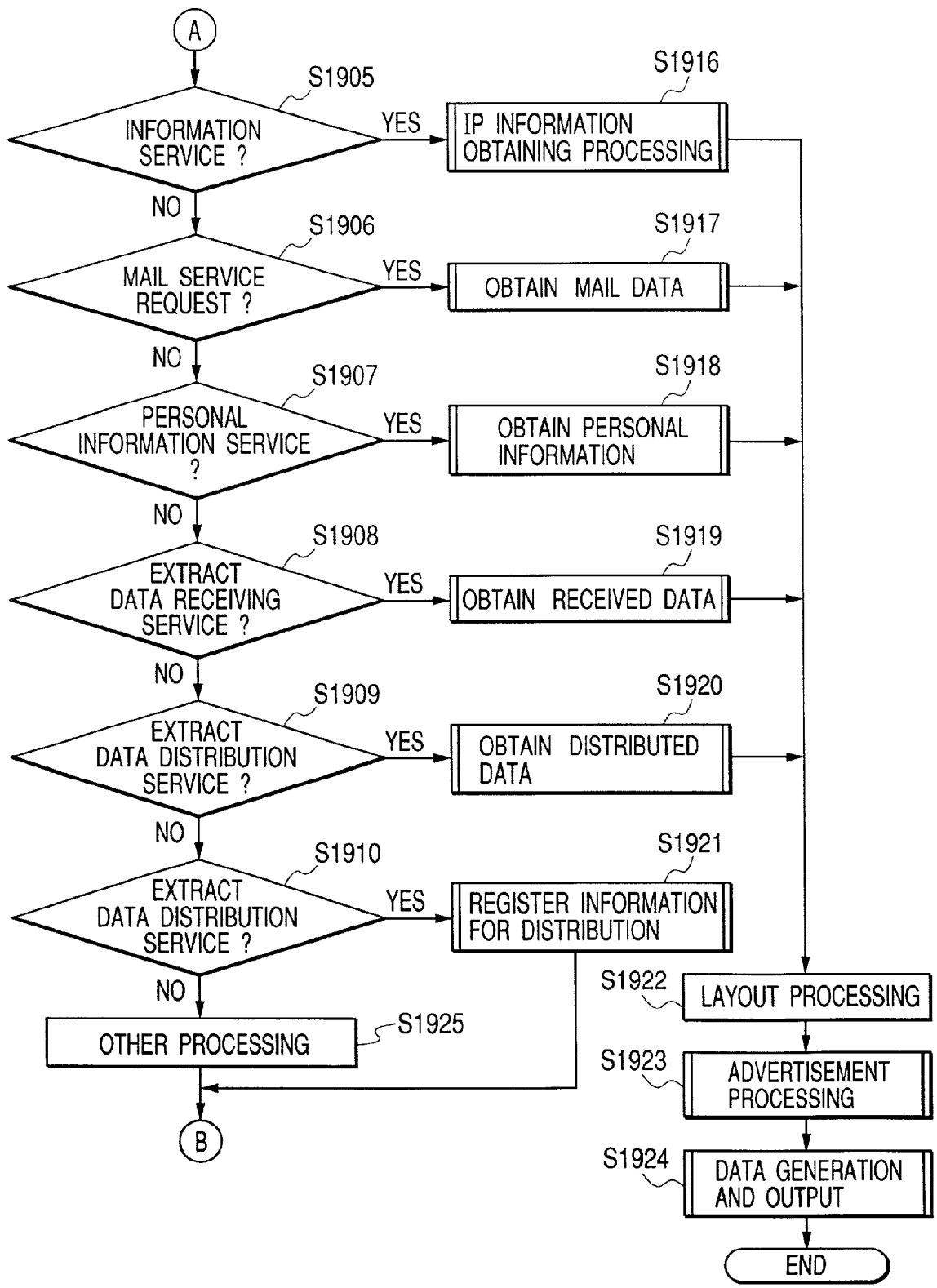
FIG. 19 is a flow chart describing the outline of the processing by the P service server of this embodiment.

In addition, if a P code is inputted from the P service terminal 200, it is determined which processing of step S1905 to step S1910 of FIG. 19 is performed.

If the inputted P code is a P code for an IP (P code classification bit is zero), it is determined that an information service is requested and the processing advances from step S1905 to step S1916 to obtain an entity of IP information and its property from the P code.

In addition, if the P code is a P code for an individual (P code classification bit is one) and is a P code registered in information for a mailing service of the user information table 313, it is determined that a mailing service is requested and the processing advances from step S1906 to step S1917. In step S1917, the P service server 300 further requests a password set for an individual, references a code number of the individual information table 318 shown in FIG. 14 to determine if a proper password has been received and, if the password is correct, obtains entities of mail data and data attached to a mail and a property of the mail from the P code table 314 for a mail of FIG. 10 based on the P code.

In addition, if the inputted P code is a P code for an individual and a P code registered in information for a personal information service of the user information table 313 shown in FIGS. 9A to 9C, it is determined that a personal information service is requested and the processing advances from step S1907 to step S1918. In step S1918, the P service server 300 further requests a password set for an individual, portion a code number of the individual information table 318 shown in FIG. 14 to determine if a proper password has been received and, if the password is correct, portion the P code table for a personal information service 317 shown in FIG. 13 to obtain a list of P codes for an IP, and obtains IP information and its property for all the P codes registered in this list.

In addition, if the inputted P code is a P code for an individual and a P code registered in information for a receiving service of the user information table 313 shown in FIGS. 9A to 9C, it is determined that extraction of data in a receiving service has been requested and the processing advances from step S1908 to step S1919. In step S1919, the P service server 300 further requests a password set for an individual, portion a code number of the individual information table 318 shown in FIG. 14 to determine if a proper password has been received and, if the password is correct, portion the P code table for a receiving service 316 of FIG. 12 to obtain an entity of distribution data corresponding to the P code and its property.

In addition, if the inputted P code is a P code for an individual and a P code registered for information for a distribution service of the user information table 313, it is determined that extraction of data in a distribution service has been requested and the processing advances from step S1909 to step S1920. In step S1920, the P service server 300 further requests a password set for an individual, portion the P code table for a distribution service 315 shown in FIG. 11 to determine if a proper password has been received and obtains an entity of distribution data corresponding to the P code and its property.

Moreover, if it is determined that registration of data has been requested, the processing advances from step S1910 to step 1921 to perform registration processing of information for distribution by a user. Here, the user can register the information for distribution in a P code for an individual (BOX) assigned to the user and in P codes for an individual (BOXes) assigned to other users.

If the user registers the information for distribution in the user's own BOX, the data is transmitted to a server and a password is set for the data to notify a P code. On the other hand, if the user registers the information for distribution in another person's BOX, the user inputs a designation of a registration destination and a password and, if the password is checked to be correct, the user can register the data in the BOX. When the data is registered, a user in the data registration destination is notified that the data has been registered and of a P code of the registered data.

Further, when necessary information has been obtained in each step of S1916 to S1920, the P service server 300 determines in step S1922 a layout for printing the obtained information on a sheet. Then, in step S1923, the P service server 300 obtains advertisement information that should be inserted in a blank on the sheet (incidentally, advertisement information in a field of the user's interest is searched and obtained based on the user information table 313 of the user). Then, in step S1924, the P service server 300 transmits the properties obtained in steps S1916 to S1920 and preview data of an image of each page obtained by steps S1922 and S1923 to the P service terminal 200. Then, when an instruction for printing is received from the P service terminal 200, the P service server 300 generates data for printing and transmits it to the P service terminal 200. The P service terminal 200 prints images by the printer 201 based on this print data.

<P Code Issue Processing>

Issue processing of a P code shown in steps S1911, S1912 and S1914 of FIG. 18 will now be described.

Figure 21:
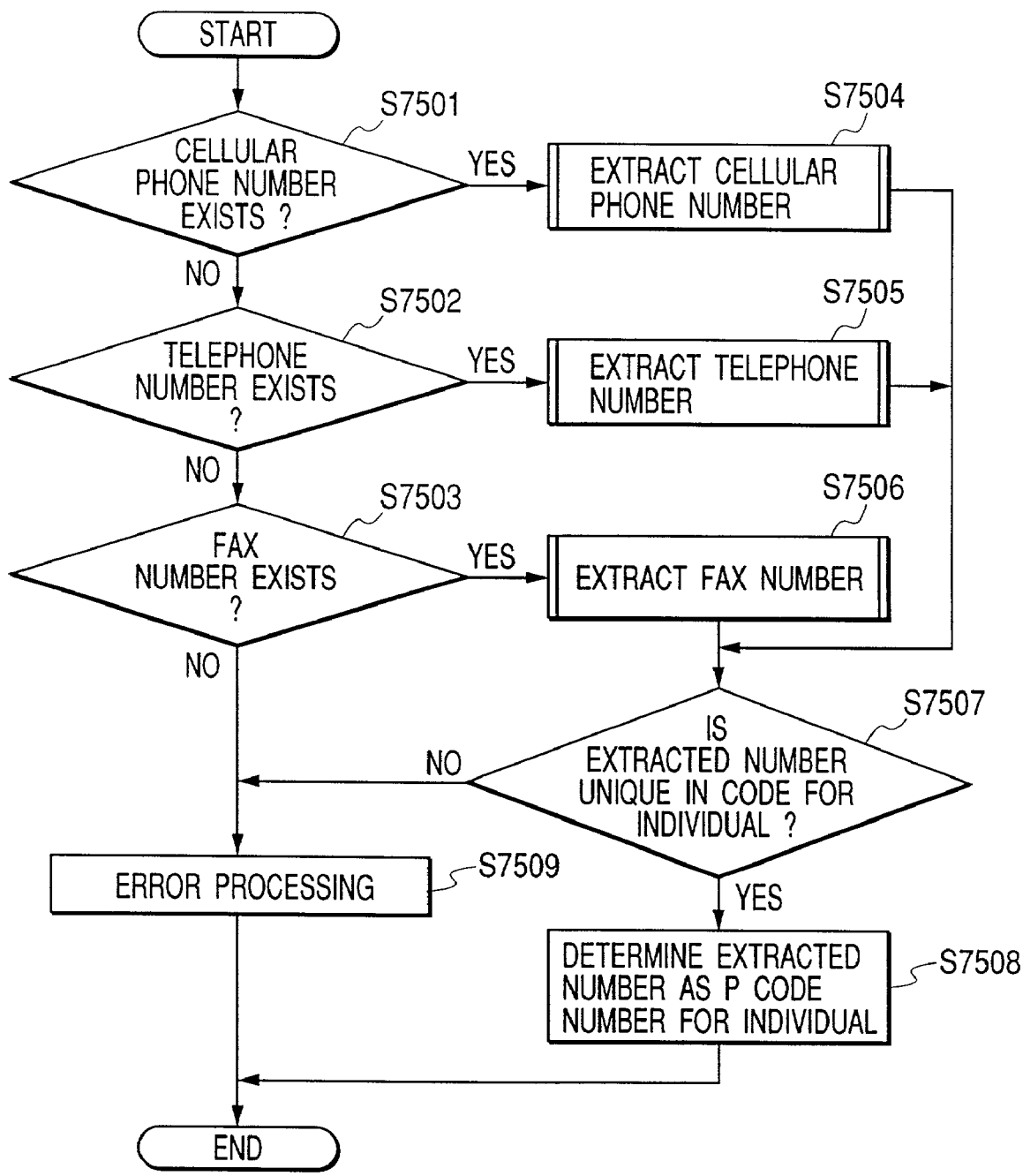
FIG. 21 is a flow chart describing procedures for issuing a number of a P code for an individual use illustrated in step S1911.

FIG. 21 is a flow chart describing an order of issuing a P code for an individual shown in step S1911.

When user information registration is performed, one of a cellular phone number, a telephone number and a fax number of a user is inputted by procedures in accordance with the above-mentioned GUI. In this embodiment, in the case of a P code for an individual, one of these inputted numbers is used in a number portion of the P code (P code number). In this embodiment, a priority is given in the order of a cellular phone number, a telephone number and a fax number. Therefore, if a plurality of numbers have been inputted by a user, a number used in the number portion of the P code is determined in accordance with this priority order. For example, if a cellular phone number and a telephone number have been inputted, the cellular phone number having a higher priority is used for issuing a P code.

If a cellular phone number has been inputted, the processing advances from step S7501 to step S7504 to extract the cellular phone number. In addition, if a cellular phone number has not been inputted and a telephone number has been inputted, the processing advances from step S7502 to step S7505 to extract the telephone number. Moreover, if only a fax number has been inputted, the processing advances from step S7503 to step S7506 to extract the fax number. If none of a cellular phone number, a telephone number and a fax number has been inputted, the processing advances to error processing of step S7509 to urge a user to input at least one of a cellular phone number, a telephone number and a fax number.

Further, when a number is extracted in any one of steps S7504 to S7506, the P service server 300 checks if the number extracted in step S7507 overlaps with a used P code for an individual. If the number overlaps with the user P code for an individual, the processing advances to step S7509 and notifies to that effect. On the other hand, if the extracted number is unique in a P code for an individual, the processing advances from step S7507 to step S7508 to determine the extracted number as the number portion of a P code and assign a P code for an individual to the user.

As described above, in this embodiment, since a P code for an individual is determined based on a cellular phone number, a telephone number or a fax number, a user can easily remember the user's own P code number.

Issue of a P code for an IP by step S1912 of FIG. 18 will now be described. A P code for an IP is issued in the P service server 300 in some cases and in the IP server 400 in other cases.

If a P code for an IP is issued in the IP server 400, the IP server 400 generates a P code by connecting a bit for an individual information ID (internal code) to a site identifying bit (external code) assigned to the IP server in advance. The IP server 400 assigns the internal code in response to a registration request of IP information and obtains one P code by connecting the external code and the internal code. Therefore, assignment processing of an external code to an IP server will be hereinafter described with reference to FIG. 22 and then issue processing of a P code for an IP will be described with reference to FIG. 23.

Figure 22:
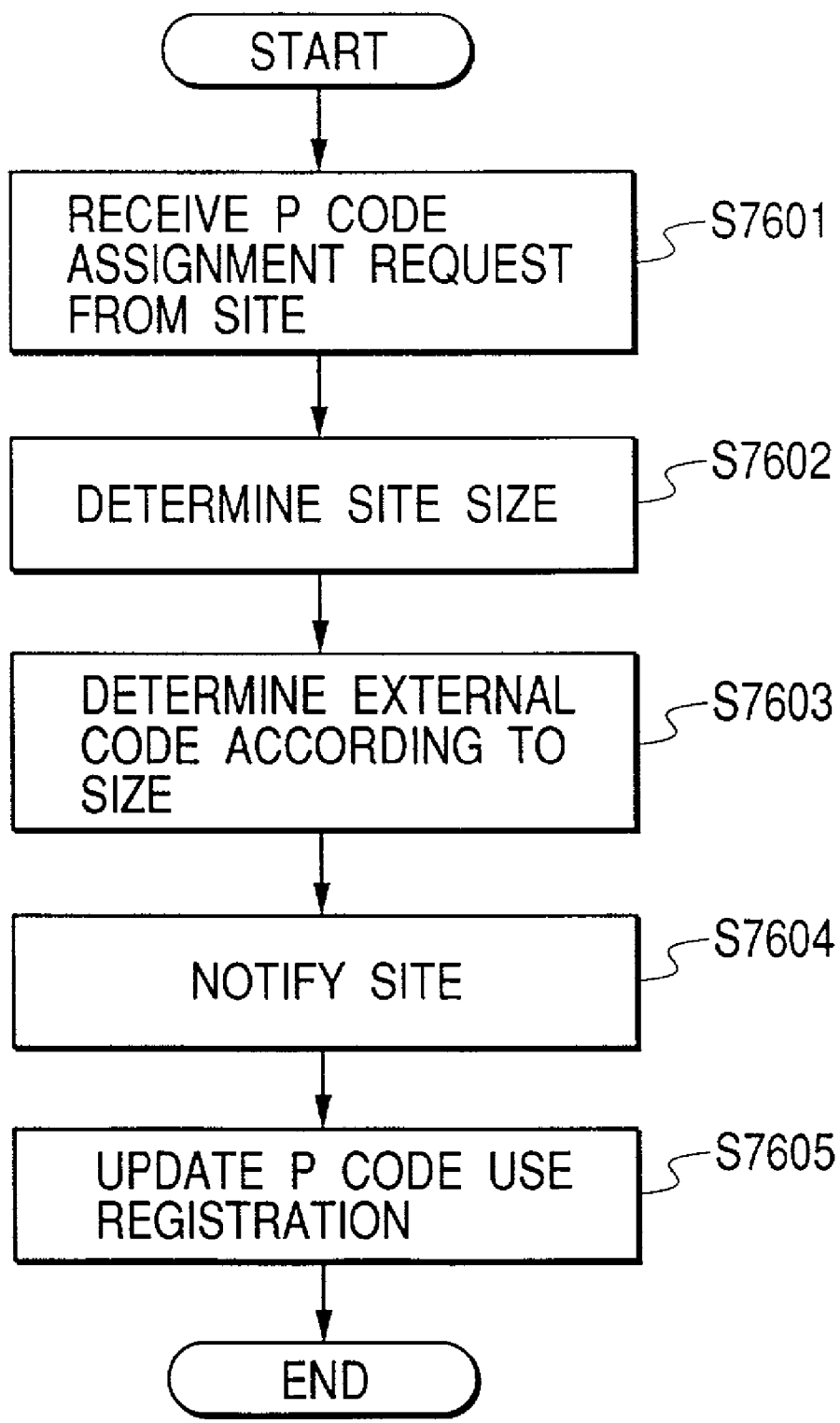
FIG. 22 is a flow chart describing procedures for the P service server to assign an external code of the P code to another site.

FIG. 22 is a flow chart describing procedures for the P service server 300 to assign an external code of a P code to another site.

Upon receiving an assignment request of a P code from a site in step S7601, the P service server 300 determines a site size in step S7602 (which is determined according to a request of a size from an IP server). When the site size is determined, four bits from the seventeenth to the twentieth bits of FIGS. 17A to 17C are determined (since an object to which a code is assignment is an external server, the seventeenth bit (server identification bit) becomes "1" naturally). Next, in step S7603, the P service server 300 determines a code value of an external code portion that is determined according to the site size determined in step S7602. For example, if the site size is a medium size, the twenty-first to the thirty-sixth bits becomes bits for an external code and a code value represented by sixteen bits is determined as shown in FIGS. 17A to 17C. It is needless to mention that the code value to be determined here is a code that is not assigned to another site at that point.

In step S7604, the P service server 300 notifies a site requesting a P code of the value determined in step S7603 as an external code. In this way, the site having requested a P code can receive a P code (external code) from the P service server 300 and issue a P code for IP information using a bit for an individual information ID (internal code).

In step S7605, the P service server 300 registers information that can be used to specify a database storing information in an IP server, that is, identification information (an address such as a URL) of a database in a P code use registration table (not shown) in the P service server 300 in association with an external code. Further, if a P code for an IP is designated from the P service terminal 200 later, the P service server 300 can reference this P code use registration table, thereby finding to which site the designated P code should be notified to obtain information.

Next, issue processing of a P code in a server having received a registration request of IP information (a P service server or an IP server) will be described. In a processing example of below, a P code is issued using a P code use table (not shown) in which a term of validity of each P code is registered.

Each IP server holds a P code use table and references it when the IP server issues a P code. A number portion of a P code (a number represented by the combination of external and internal codes in the case of an IP server or a number represented by the seventeenth to the fiftieth bits in the case of the P service server 300) and a term of the code validity is registered in the P code use table. Further, the term of the code validity is data identical with "a term of code validity" shown in the IP information registration table 311 of FIG. 7. The term of the code validity is automatically to the term set by an information provider at the time of registration of IP information or as a predetermined period of time, for example, three months, after the completion of the term of information validity set by the information provider. In this way, a period when a P code is not used is given, whereby a defect such as to which an identical P code is assigned changes significantly after a certain date. Further, since an external code is common in one site, only an internal code may be recorded in "a number portion of a P code" of the P code use table.

In the P service server 300, since a number portion of a P code is composed of an identification bit and a code portion of thirty-nine bits, it is sufficient to register a code represented by this thirty-nine bits in a column of "a number portion of a P code".

Figure 23:
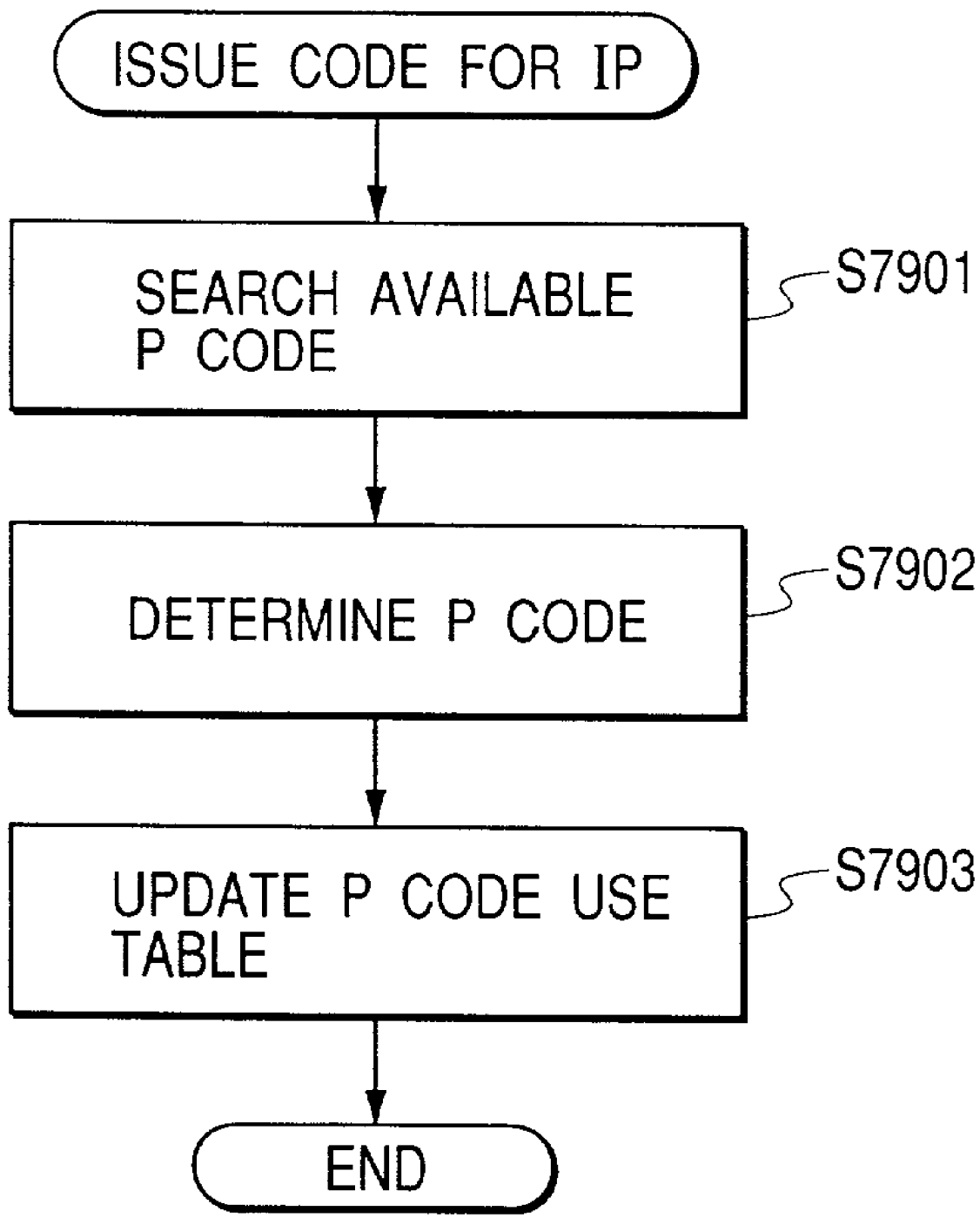
FIG. 23 is a flow chart describing processing for issuing a number of a code for an IP.

FIG. 23 is a flow chart describing issue processing of a P code for an IP. When step S1912 of FIG. 18 is executed upon receiving a registration request of IP information, P codes that can be used in the server is first detected with reference to the above-mentioned P code use table in step S7901. In step S7902, one P code is determined out of usable P codes and assigned to the IP information. Here, if an IP server assigns a P code, the IP server searches the above-mentioned P code use table to obtain an unused internal code and determines a P code that should be given to information by connecting the internal code with an external code of the IP server, a classification code (code indicating a site size) and a server identification bit (=1). On the other hand, if the P service server 300 assigns a P code, the P service server 300 obtains a P code by connecting an unused bit of thirty-nine bits to an identification bit (the seventeenth bit=0) as shown in FIG. 18.

Further, an unused P code means a P code past the "term of code validity". The determination of the unused P code may be made by searching a P code past the term of code validity stored in a table or by constantly comparing time information such as a year, a month and a day and a term of code validity in the table to store an unused identifier in the table at the point when the term of validity of the code elapsed.

Next, in step S7903, a P code use table in the server is updated. That is, a P code assigned anew and a term of validity of the P code are set to a period designated at the time of registration of IP information or set as a predetermined period of time (e.g., three months) after the IP information set by an information provider.

In this way, a P code for an IP is issued. Further, although a term of code validity is referenced at the time of issuing a P code for an IP, it is checked if the present date is within a range of "a starting date of insertion" until "a term of information validity" registered in the IP information registration table 311 (FIG. 7) of the P code in taking out information corresponding to a designated P code for an IP.

Further, a P code use table is prepared for performing the issue processing fast in this example. However, since a term of validity of a code is registered in the IP information registration table 311 as shown in FIG. 7, it is evident that a P code may be issued with reference to this validity.

Further, the step of issuing a P code to advertisement information S1914 is similar to an issuing method of a P code to IP information.

<P Code Issue Processing of Electronic Mail Information>

Processing when an electronic mail is sent to the mail server 600 and a method of issuing a P code for a transferred electronic mail will now be described with reference to FIGS. 24, 25A and 25B.

Figure 24:
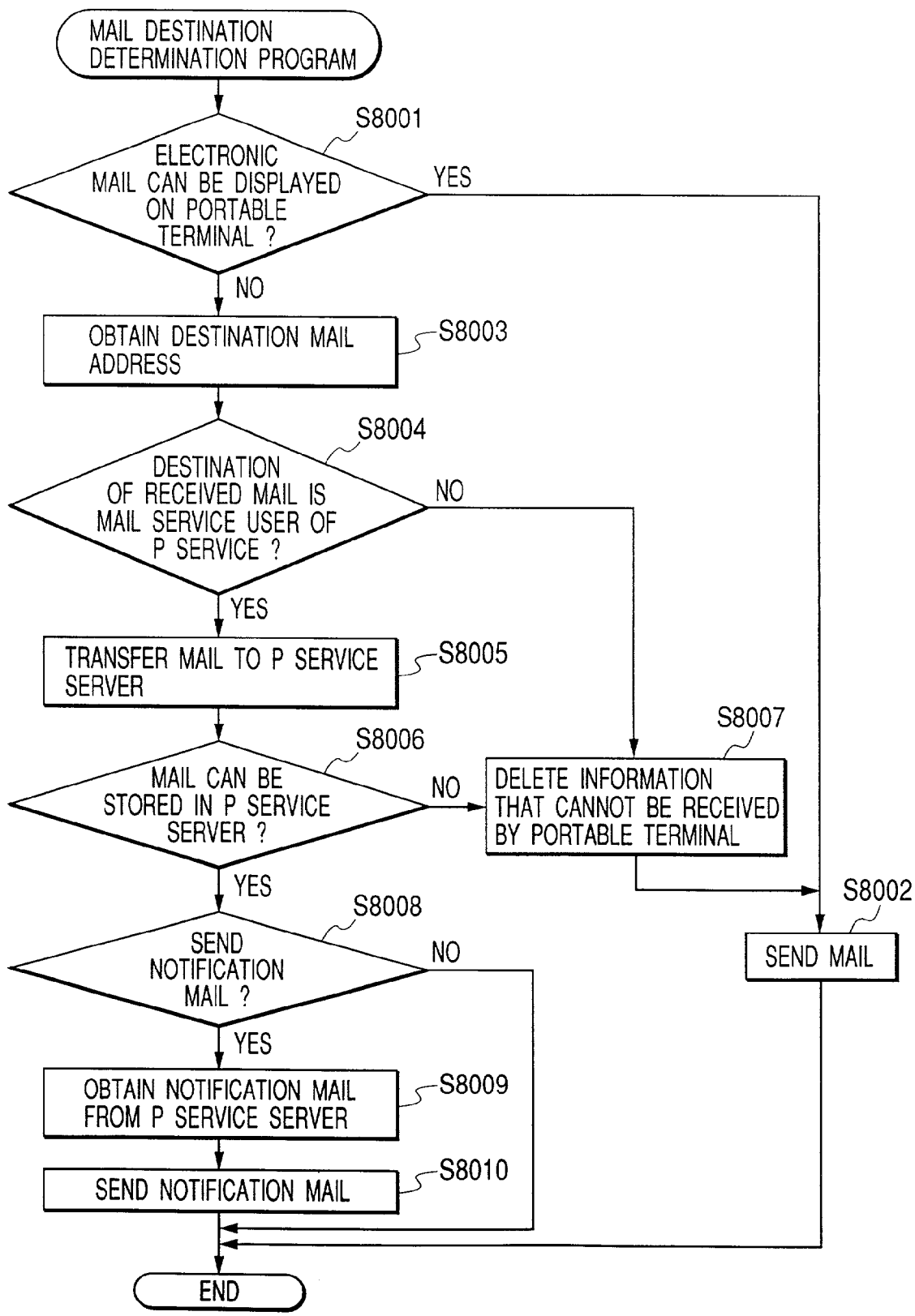
FIG. 24 is a flow chart showing procedures of processing by the mail server 600 when an electronic mail is sent to the mail server 600.

FIG. 24 is a flow chart showing processing procedures of the mail server 600 when an electronic mail is sent to it.

When an electronic mail is sent to the mail server 600, the mail transmission and reception program 605 receives the electronic mail and initiates the mail destination determination program 606 to determine whether the mail server 600 sends the received electronic mail to the portable terminal 500 through the portable terminal network connection service 120 or to the P service server 300.

The mail destination determination program 606 determines in step S8001 whether or not the received mail can be displayed on a portable terminal of a mail receiver as it is. The determination is performed based on a content type of the electronic mail and a number of bytes of a mail text. The mail destination determination program 606 determines that an electronic mail in which the content type is multipart or the number of bytes of a text is equal to or more than 1024 bites cannot be displayed on a portable terminal as it is.

If it is determined in step S8001 that the electronic mail can be displayed on the portable terminal as it is, the electronic mail is sent to the portable terminal in step S8002. Transmission of the electronic mail is performed by the mail transmission and reception program 605.

If it is determined in step S8001 that the electronic mail cannot be displayed on the portable terminal, the mail destination determination program 606 analyzes items of TO:, CC: and BCC: from the header of the received electronic mail to obtain a destination mail address in step S8003.

Processing of subsequent steps S8004 to S8010 is processing to be performed for each of obtained mail addresses.

In step S8004, the mail destination determination program 606 of the mail server 600 transmits a destination mail address to the P service server 300 via the communication portion 604. The P service server 300 runs a search as to whether or not the mail address transmitted from the mail server 600 exists in object mail addresses of information for a mailing service of the user information table 313, and if the mail address is found, returns a P code of the searched user based on the user information table 313 or, if it is not found, returns zero.

If the P code of the user is returned from the P service server 300, the mail server 600 determines that the destination of the received mail is a mail service user of the P service and the processing advances to step S8005. If zero is returned from the P service server 600, the processing advances to step S8007.

In step S8005, the mail server 600 transfers the received mail and the P code of the user obtained from the P service server 300 in step S8004 to the P service server 300. Upon receiving the received mail, the P service server 300 analyzes and decomposes its contents, determines whether or not the contents can be stored in the P service server 300, and if the contents can be stored, issues a P code to return the P code to the mail server. In addition, if the contents cannot be stored, the P service server 300 returns a code zero to the mail server. This processing of the P service server will be described later with reference to FIGS. 25A and 25B.

In step S8006, the mail server 600 analyses the code returned from the P service server 300 in step S8005, and if the code is zero, the processing advances to step S8007, or if it is not zero, advances to step S8008.

Step S8007 is the processing of the mail server 600 when mail data cannot be registered in the P service server 300. In this case, information that cannot be displayed on the portable terminal 500 due to the contents of the received mail is cut, and the mail server 600 notifies the portable terminal 500 of that effect by an electronic mail in step S8002.

In step S8008, the mail server 600 determines if a notification mail is sent to the user. The mail server 600 passes the P code received in step S8006 to the P service server 300, thereby obtaining a notification flag from information for a mailing service of the user information table 313 in the P service server 300. The processing advances to step S8009 if the mail server 600 sends a notification to the user, or ends the processing if it does not send a notification.

In step S8009, the mail server 600 obtains the contents of the notification mail from the P service server 300. The mail server 600 passes the P code received in step S8006 to the P service server 300, thereby obtaining the contents of the notification mail including the P code from the P code table for a mailing service 314.

In step S8010, the mail server 600 transmits the notification mail including the P code obtained in step S8009 via the mail transmission and reception program 605.

Figures 25, 25A:
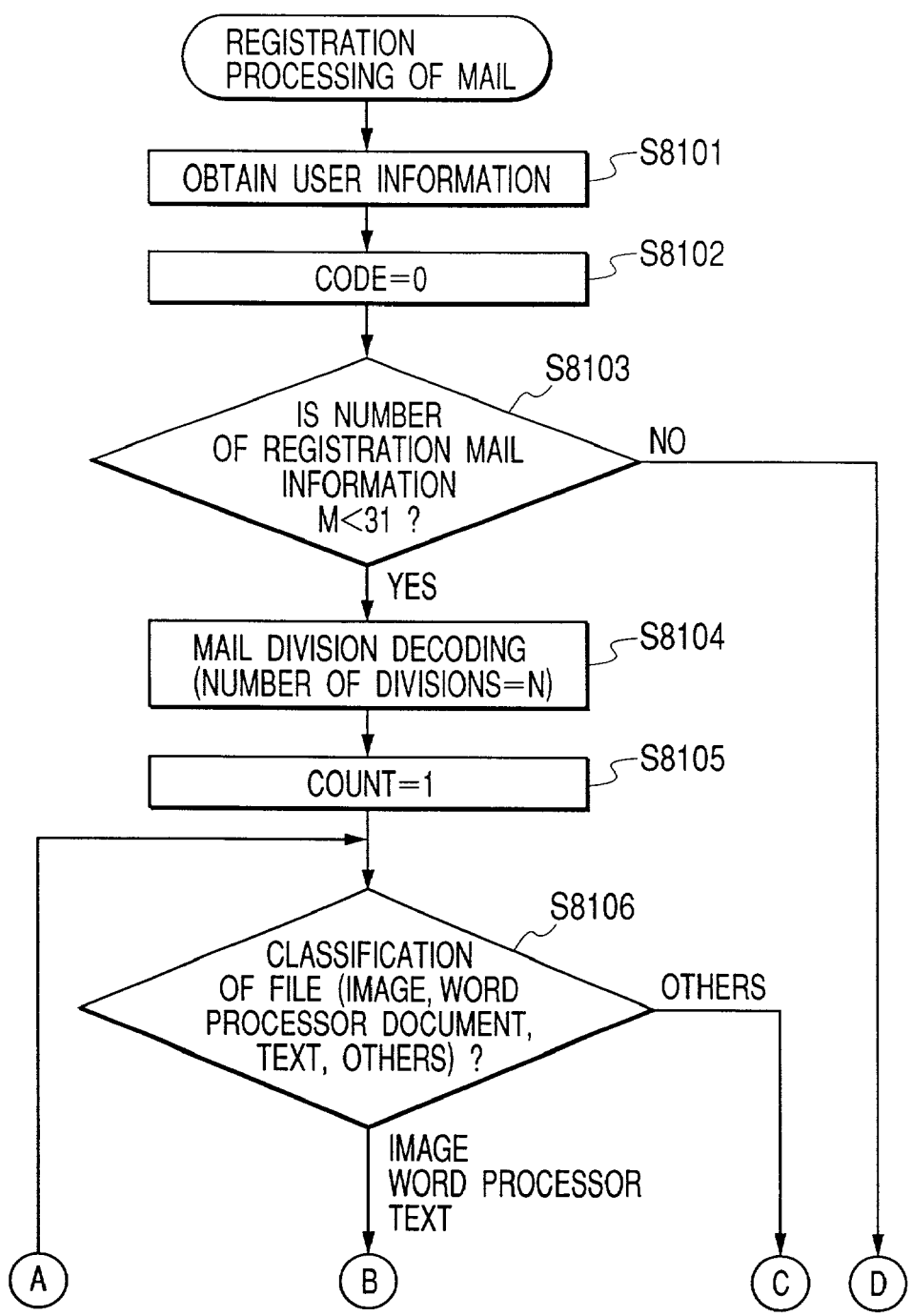
FIG. 25, composed of FIGS. 25A and 25B, is a flow chart showing processing by the P service server 300 when a user P code and a mail information are transferred to the P service server 300 from the mail server 600.
Figure 25B:
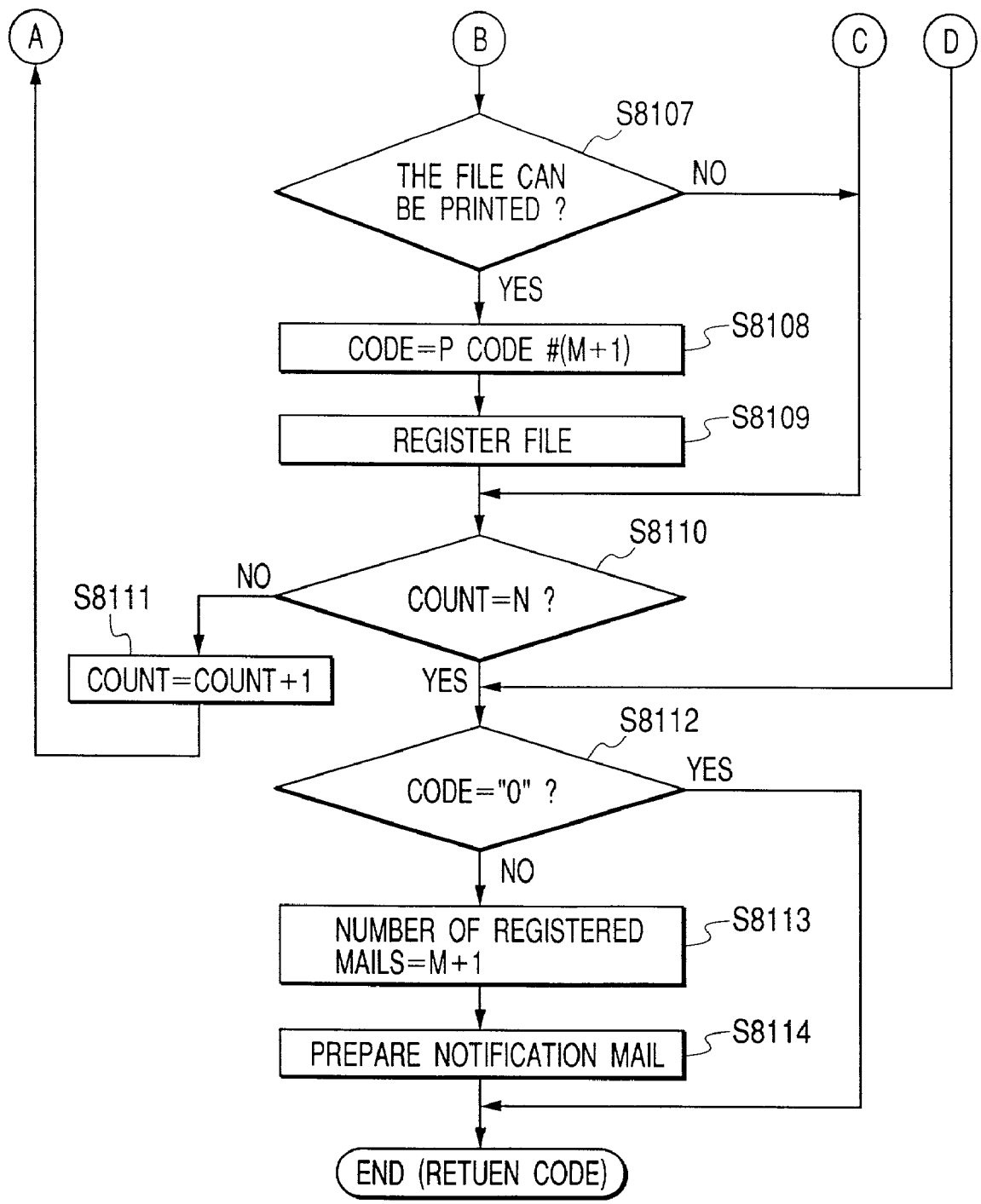

FIGS. 25A and 25B are flow charts showing processing of the P service server 300 in steps S8004 to S8005 and step S8009.

In step S8101, the P service server 300 obtains a P code for the user and the user information table 313 for the user from a destination mail address sent from the mail server 600.

In step S8102, the P service server 300 initializes a code to be returned to the mail server by "0".

In step S8103, the P service server 300 obtains a number (M) of registered mails from the user information table 313 and determines if there is a space area for mail registration. Since an upper limit of a sub-code to be assigned to each service is defined as 31 in this embodiment, the P service server 300 determines that there is a space area if M is smaller than 31 and determines that there is no space area if M is equal to or larger than 31. If there is a space area, the processing advances to step S8104, or if there is no space area, the processing ends and the P service server 300 returns the code to the mail server 600.

If the content type of the mail information sent from the mail server 600 is multipart, the P service server 300 divides the mail into individual parts using boundary in step S8104. Moreover, the P service server 300 decodes an encode (usually, Base 64, uuencode or the like) given by Content-Transfer-Encoding to recover an attached file. If the mail is divided, the number of divided mail is assumed to be N. (If not divided, the number is assumed to be N=1.)

The P service server 300 initializes a work variable for counting the number of files, assuming that count=1 in step S8105.

Processing of the following steps S8106 to S8111 is performed for the number of divided files.

The P service server 300 classifies the files in step S8106. The files are classified into a word processor document, an image file, a text file and others. Concerning a mail including a mail body of the number of characters that cannot be fully sent to the portable terminal 500, the mail body is classified as a text file. Here, mails classified into the "others" are excluded from the processing of this service, and the processing advances to find the next file in step S8110. If a file is determined to be an image, a word processor document or a text file in the classification, the processing advances to step S8107. Further, although a word processor document, an image file and a text file are objects of the classification in this embodiment, files of other applications may be the objects.

In step S8107, the P service server 300 determines if a file that a user currently attempts to register can be printed from the P service terminal 200. First, the P service server 300 obtains a service type of information for a mailing service from the user information table 313. In the user information table 313, usage formats of a mailing service set at the time of user information registration are registered. If the user has made a setting for printing the file according to a type of the file that the user currently attempts to register, the user opens the file in the P service server 300 and finds as to whether there is an application program that can be applied to print processing. If such an application program is found, it is determined that the file can be printed and the processing advances to step S8108. Otherwise, the processing advances to step S8110.

In step S8108, the P service server 300 sets a code that is a user P code with a sub-code (M+1) added to it (P code # sub-code) in the code.

In step S8109, the P service server 300 registers a file in an area of the sub-code M+1 of the P code table for a mailing service 314 and adds the number of files of entity file information by one. In addition, if a mail property has not been set yet, the P service server 300 extracts necessary items (subject, from, date) from a mail header to register them.

In step S8110, the P service server 300 determines if the count is equal to N. If the count is equal to N, the registration processing has been ended for all the divided files, and the processing advances to step S8112.

If the count is not equal to N, the P service server 300 adds the count by one in step S8111 and obtains the next divided file to return to step S8106.

In step S8112, the P service server 300 determines if the code is equal to "0". If the code is equal to "0", any mail information has not been registered. Otherwise, the P service server 300 adds the number of registered mails of the information for a mailing service of the user information table 313 by one in step S8113.

In step S8114, if information is registered in the P code table for a mailing service 314 and if the registration is to be notified to the user by a notification flag of the user information table 313, the P service server 300 prepares a mail sentence for notification to register it in the P code table for a mailing service 314.

Figure 26:
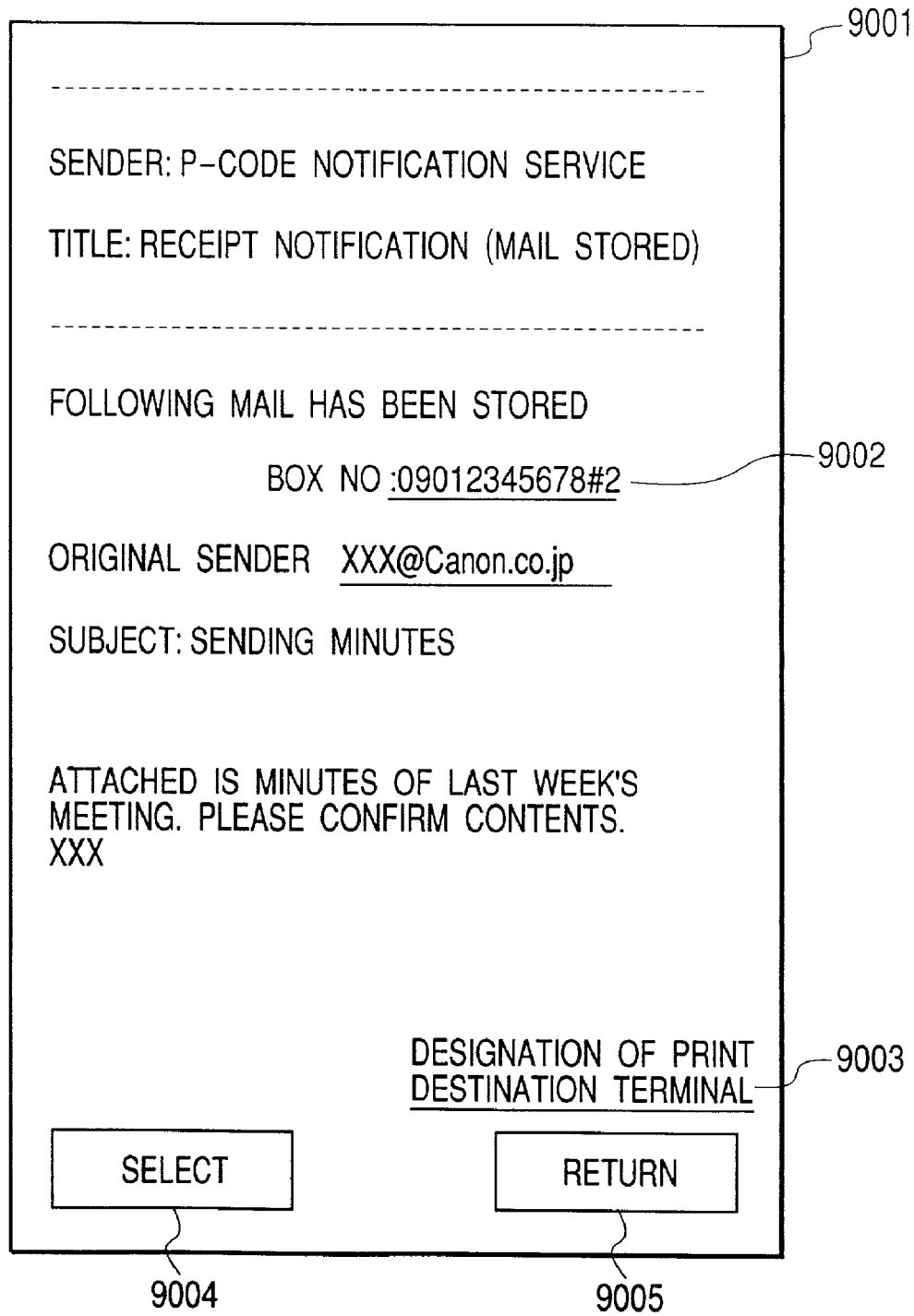
FIG. 26 illustrates an example of a notification screen showing that a mail has arrived which cannot be fully displayed on a portable terminal.

This mail sentence is a text in which a sender, a sending date and time, and a P code for extracting this information are written, and is displayed as shown in FIG. 26 when it is received by a portable terminal.

Then, the P service server 300 returns the code to the mail server 600, thereby ending the registration of the mail in it.

In addition, although the P service server 300 prepares a notification mail and saves its information in this embodiment, it is needless to mention that it is also possible to return information that should be notified from the P service server 300 to the mail server 600, and the mail server 600 prepares a notification mail including the information to notify the user of the information.

<P Code Notification to a User>

A method of notifying a user of a P code will now be described. Notification of a P code to the user is performed in such cases as to when an electronic mail transferred from a mail server is registered in a mailing service, data is registered in a receiving service and a validity will soon expire. Here, the method will be described with reference to the case in which an electronic mail that cannot be fully received by the portable terminal 500 is registered as an example.

Figure 27:
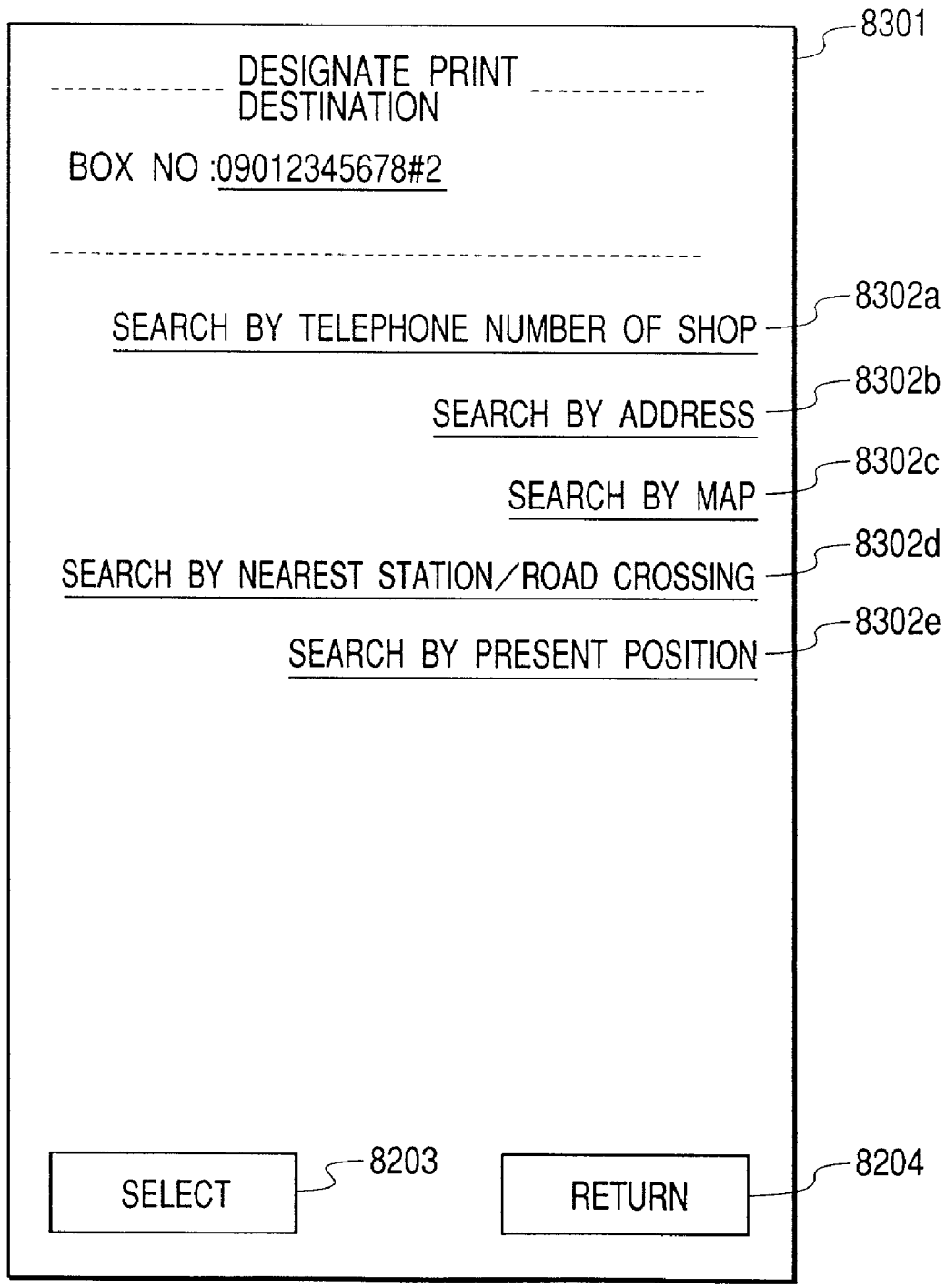
FIG. 27 illustrates an example of a display screen for designating a print destination terminal.

As shown in FIGS. 24, 25A and 25B, when an electronic mail that cannot be received by the portable terminal 500 is registered in the P service server 300, a notification mail is sent to the user. Upon receiving the notification mail, the portable terminal 500 displays a screen 9001 as shown in FIG. 26. Reference numeral 9002 denotes a P code for information stored in the mailing service. A not-shown cursor is placed in "designate a print destination terminal" shown by reference numeral 9003 and "selection" shown by reference numeral 9004 is executed, whereby print information corresponding to the P code 9002 can be sent to the P service terminal 200 designated by the user in advance. When "designate a print destination terminal" is selected, a print destination terminal designation screen as shown in FIG. 27 is displayed to search and designate a print destination terminal. If the print information is sent to the print destination terminal in advance, the waiting time in printing in the print destination terminal can be reduced. Further, if a print destination terminal to which print information is sent in advance is designated beforehand in the user information table 313, the print information may be automatically sent to the print destination terminal in advance. In addition, when "return" shown by reference numeral 9005 is executed, the screen returns to the state before the receipt notification screen is displayed, for example, a mail list display or the like of a mailer of the portable terminal.

<Description of Print Output Processing>

Print output of information in the P service terminal 200 will now be described. Any one of information obtaining processing (hereinafter referred to as information service) of step S1916, mail data obtaining processing (hereinafter referred to as a mailing service) of step S1917, personal information obtaining processing (hereinafter referred to as a personal information service) of step S1918, received data obtaining processing (hereinafter referred to as a receiving service (receipt of registered information)) of step S1919 and distribution data obtaining processing (hereinafter referred to as a distribution service (receipt of registered information)) of step S1920 is performed in the P service server 300 based on a P code inputted from the P service terminal 200, and then information obtained is transmitted to the P service terminal 200 and printed to be outputted.

The P service terminal 200 has an initial screen 9501 as shown in FIG. 28. In the initial screen 9501, buttons 9502 to 9504 for inputting a P code and a button 9505 for registering information in a distribution service are arranged. As a method of inputting a P code, a method of manually inputting a P code using a touch panel (button 9502), a method of inputting a P code written in a mail notified to a portable terminal using infrared ray communication or the like (button 9503), a method of inputting a P code using a bar code reader (button 9504), and the like are prepared.

If an inputted P code is a "P code for an individual" and a suffix with "#", the P service terminal 200 displays a screen for providing a mailing service.

FIG. 29 is a screen for displaying contents of a mail of the user corresponding to the inputted P code for an individual. More specifically, a suffix (#n, n: 0, 1, 2, ... ) in the inputted P code and a corresponding subject of the mail, a sender, the number of pages and printing conditions(in this embodiment, in particular, designation of color/black and white printing and whether or not printing is performed can be designated as printing conditions, and buttons 10305a to 10305c are prepared, respectively) in the inputted P code are displayed in an area 10305.

An area 10306 is an area for displaying printing contents of a print object mail in the area 10306. Further, an "advertisement setting" button may be added to the area to allow a user to insert an advertisement together with the mail or to allow the P service server 300 to search an appropriate advertisement and a print object mail to print them altogether.

A button 10307 is pressed down when a print preview display of a print object mail is executed. A button 10308 is pressed down when a print option of a print object mail is set. When the button 10308 is pressed down, a screen shown in FIG. 30 for setting a print option is displayed. Details of this screen will be described later. A button 10309 is pressed down when a print object mail is printed. A button 10310 is pressed down to return to the preceding screen. A button 10311 is pressed down when setting contents to be set in the indication of the screen 10301 are canceled.

A button 10302 is pressed down when all mails of the user managed in the P service server 300 are printed. A button 10303 is pressed down when mails with numbers smaller than a suffix of a currently-displayed mail list are displayed as a list. A button 10304 is pressed down to display mails with numbers larger than a suffix of a currently-displayed mail list are displayed as a list when there are mails that cannot be displayed in the area 10305.

Further, in this embodiment, if a number of a suffix (#n) attached to a telephone number being an inputted P code is "0", mails corresponding to the P code for an individual (telephone number) are displayed as many as possible as shown in FIG. 29. In addition, if the number of the suffix is the any number other than "0", mails corresponding to a suffix coinciding with the number are also displayed. Further, although not shown, in the case of mail information, a function that can delete a mail without printing is provided.

Figure 30:
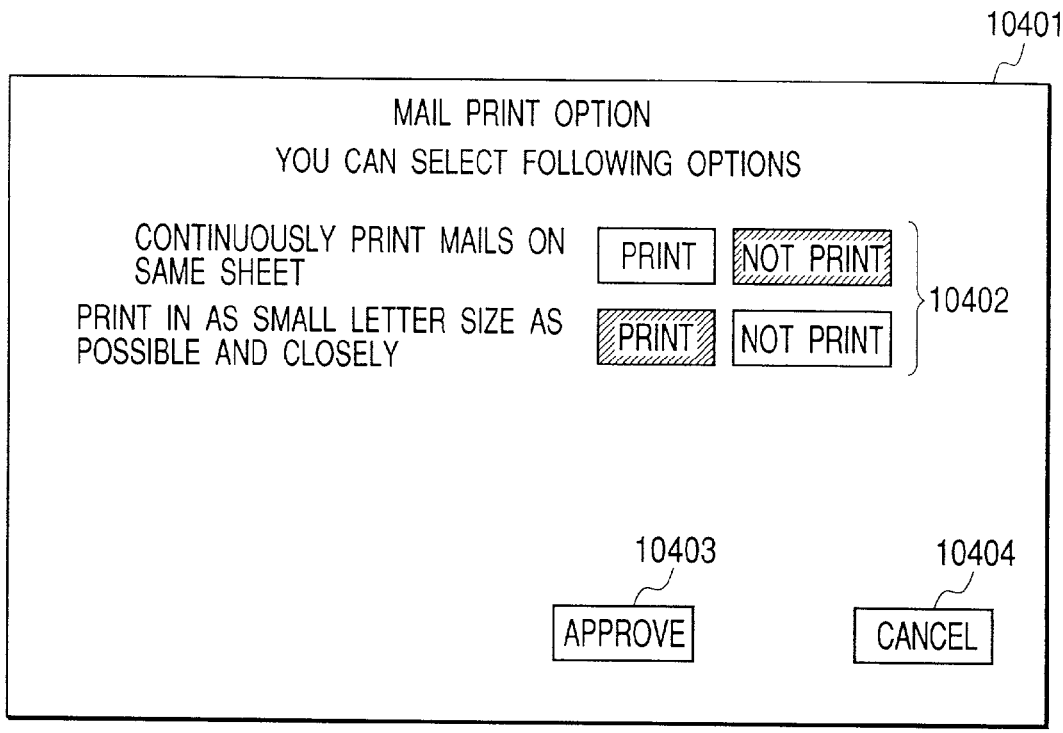
FIG. 30 illustrates an example of a display screen at the time of setting a mail print option in a mailing service.

When the button 10308 is pressed down, an option setting screen 10401 shown in FIG. 30 is displayed.

The screen 10401 is a screen for setting a print option of a print object mail. As shown in FIG. 30, a group of items that can be set as a print option (in this embodiment, "mails are continuously printed on a same sheet" and "print in as small characters as possible and closely") is displayed in the screen 10301, and it is possible to designate whether each item is executed or not by a group of buttons 10402. A button 10403 is pressed down to accept a set print option. A button 10404 is pressed down to cancel a set print option.

Figure 31:
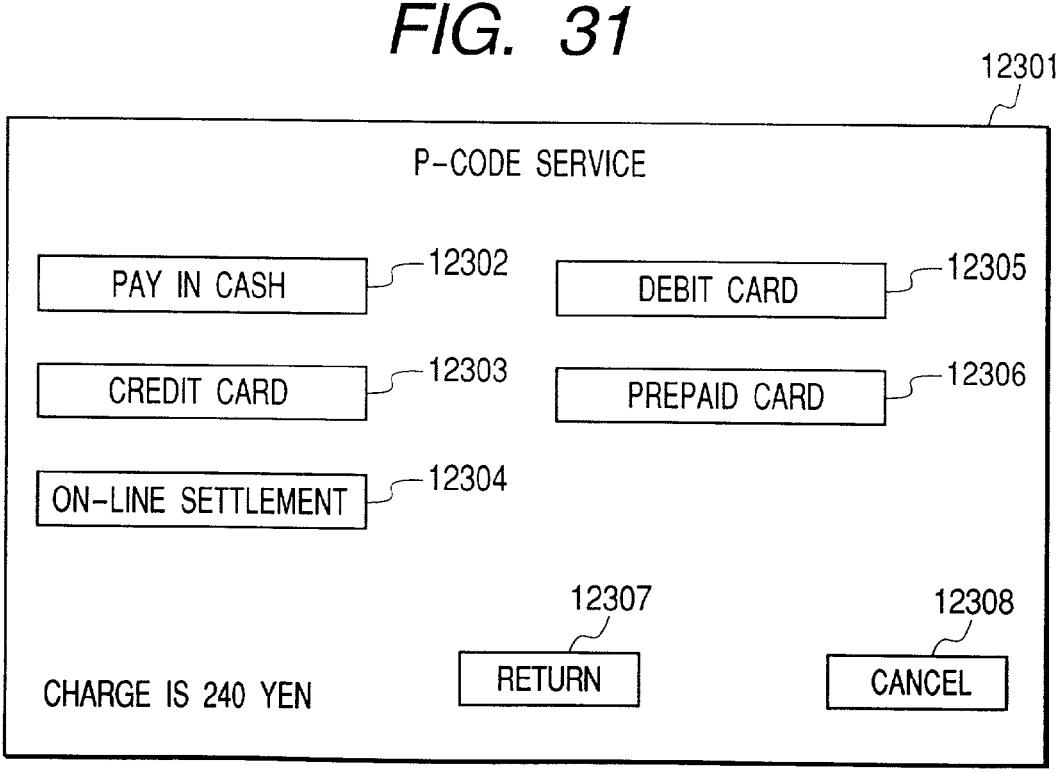
FIG. 31 is a diagram showing an example of a display screen at the time of charge settlement.

A screen 12301 of FIG. 31 is a screen for selecting a method of settling charges that are generated when each of an information service, a mailing service, a distribution service (receipt of registered information), a personal information service and a distribution service (registration of information) is executed. An incurred charge is displayed on the bottom left corner of the screen. A user presses a button 12302 when the generated charge is paid by cash, a button 12303 when the charge is paid by a credit card, a button 12304 when the charge is paid by an online settlement, a button 12305 when the charge is paid by a debit card, and a button 12306 when the charge is paid by a prepaid card. Then, a screen required for the settlement (now shown) is displayed according to the pressing of these buttons. A button 12307 is pressed down to return to the preceding screen. A button 12308 is pressed down to cancel execution of selection of a settlement method.

In the following processing flow, the P service server 300 references each table shown in FIGS. 7 to 16 to transmit information corresponding to the P code to be received from the P service terminal 200 and the data required for the information (property data, a preview image or the like) to the P service terminal 200. In addition, the P service server 300 updates the contents of each table shown in FIGS. 7 to 16 according to data such as an instruction to print information corresponding to the P code to be transmitted from the P service terminal 200. In addition, if a standard output destination information of a user information table shown in FIGS. 9A to 9C is designated, the P service server 300 transfers print information to the P service terminal 200 to update the contents of the table shown in FIG. 2B held by the P service terminal 200. If a notification setting of the user information table shown in FIGS. 9A to 9C is made, the P service server 300 notifies the user of P code information and its status when information related to the notification is updated.

Figure 32:
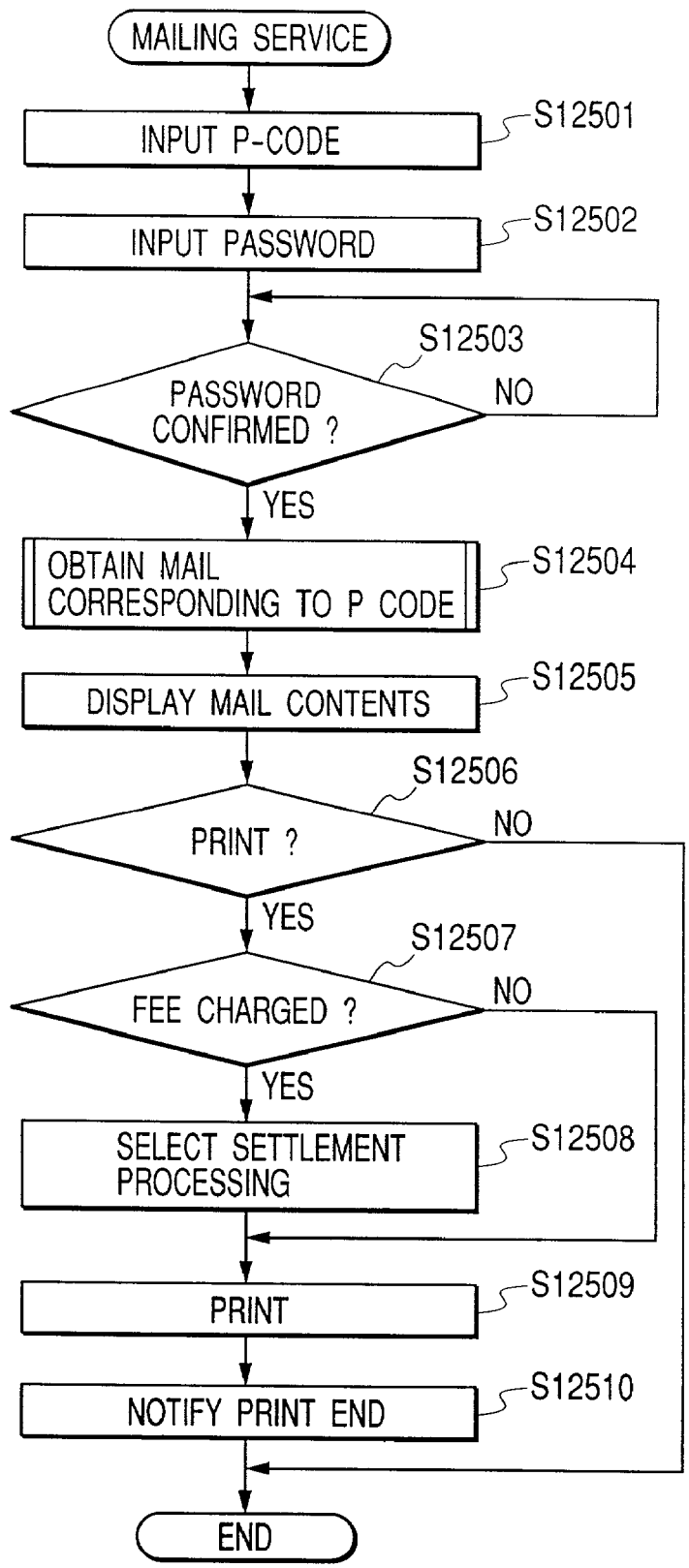
FIG. 32 is a flow chart showing a processing flow in the case where a mailing service is executed.
Figure 33:
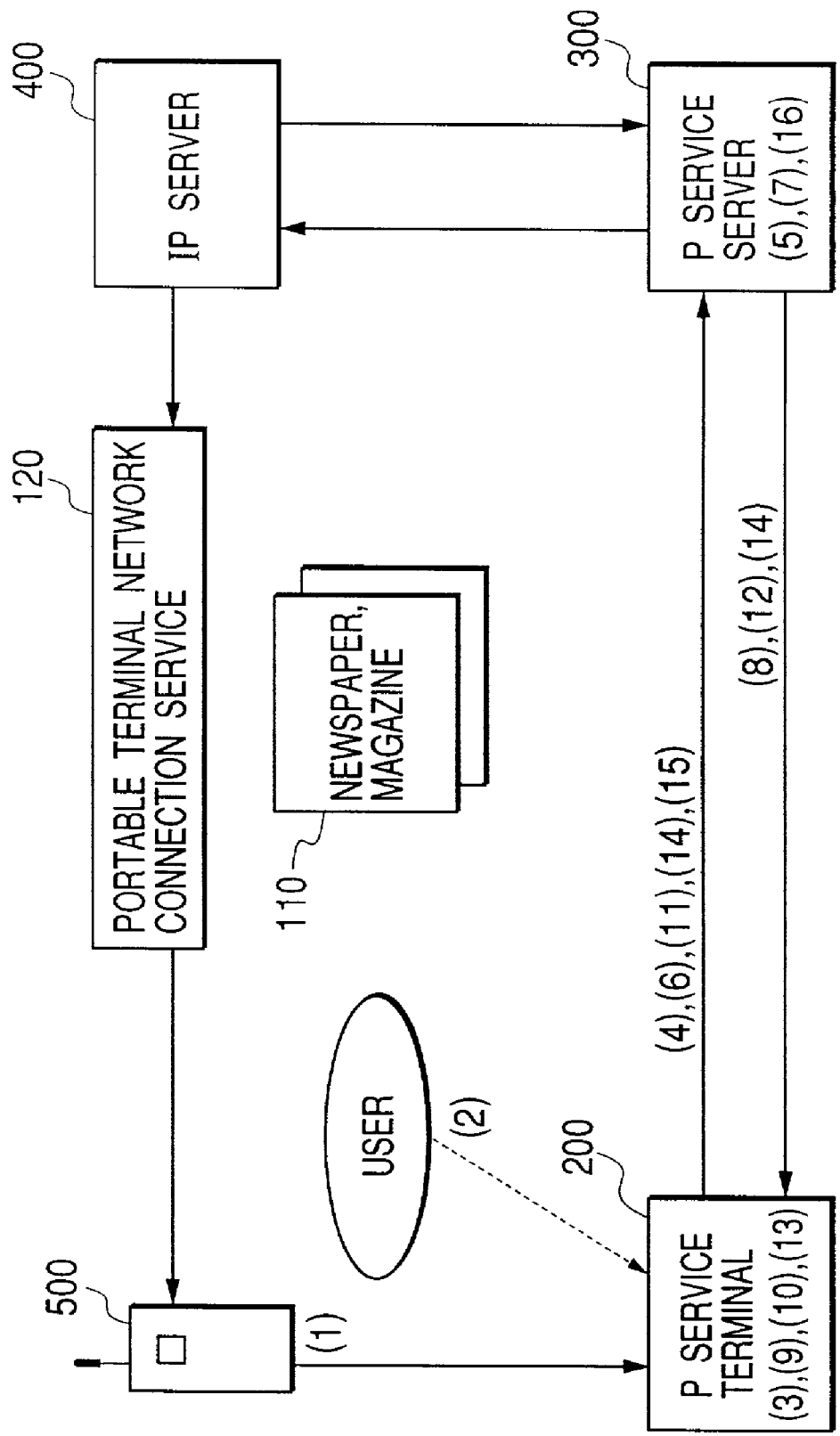
FIG. 33 illustrates an order of processing in a service system in the case where a mailing service is executed.

A processing flow in the P service terminal 200 at the time when a P code for a mailing service is inputted is shown in FIG. 32. In addition, the order of processing in a service system at the time when a P code for a mailing service is inputted is shown in FIG. 33. Further, it is assumed that mail information that should be outputted has already been transferred from a mail server to the P service server 300.

First, in step S12501, (1) the user acquires a P code in the portable terminal 500 according to a notification mail. (2) The user moves to the P service terminal 200 in a state that the P code is stored in the portable terminal 500. (3) The P code is inputted to the P service terminal 200 by the user. (4) The P service terminal 200 transmits the inputted P code and a terminal property of the P service terminal 200 itself (a location, a printer performance or the like) to the P service server 300.

In step S12502, (5) when the P service server 300 recognizes the received P code as a P code for a mailing service, (6) the P service terminal 200 requests the user to input a password. In step S12503, (7) the P service terminal 200 confirms the password. If the password is not correct (NO in step S12503), the P service terminal 200 requests the user to input the password again. However, if a correct password is not inputted for a plurality of times, the P service terminal 200 ends the processing. On the other hand, if the password is correct (YES in step S12503), the processing advances to step S12504.

In step S12504, (8) the P service server 300 obtains the contents of a mail corresponding to the received P code and transmits the contents of obtained property data (a sender, a subject) or the like to the P service terminal 200.

In step S12505, (9) the P service terminal 200 displays the contents of a mail such as the received property data on the touch panel 204 (FIG. 29). Here, if a print preview or an option setting is designated, the P service terminal 200 displays a corresponding screen appropriately and receives an input by the user.

In step S12506, (10) the P service terminal 200 determines whether or not printing of the displayed mail has been instructed. (11) If cancellation of printing has been instructed (NO in step S12506), the P service terminal 200 notifies the P service server 300 of the effect that cancellation has been instructed and ends the processing. On the other hand, (11) if printing has been instructed (YES in step S12506), the P service terminal 200 requests the P service server 300 to prepare the print data of a mail corresponding to the P code and the processing advances to step S12507.

In step S12507, the P service terminal 200 determines whether or not a mail to be printed is charged. (12) If it is free (NO in step S12507), the processing advances to the next processing. On the other hand, (13) if it is charged (YES in step S12507), the processing advances to step S12508 to receive a method of settlement of settlement processing in printing from the user, and (14) the P service terminal 200 and the P service server 300 transmit and receive the necessary data according to the method of settlement (FIG. 31). Then, the P service terminal 200 receives print data of a print object mail from the P service server 300 in step S12509 to print the mail. When the printing ends, (15) the completion of the printing is notified to the P service server 300 from the P service terminal 200 in step S12510, and (16) mail information which printing has been ended is automatically deleted by the P service server 300.

Figure 34:
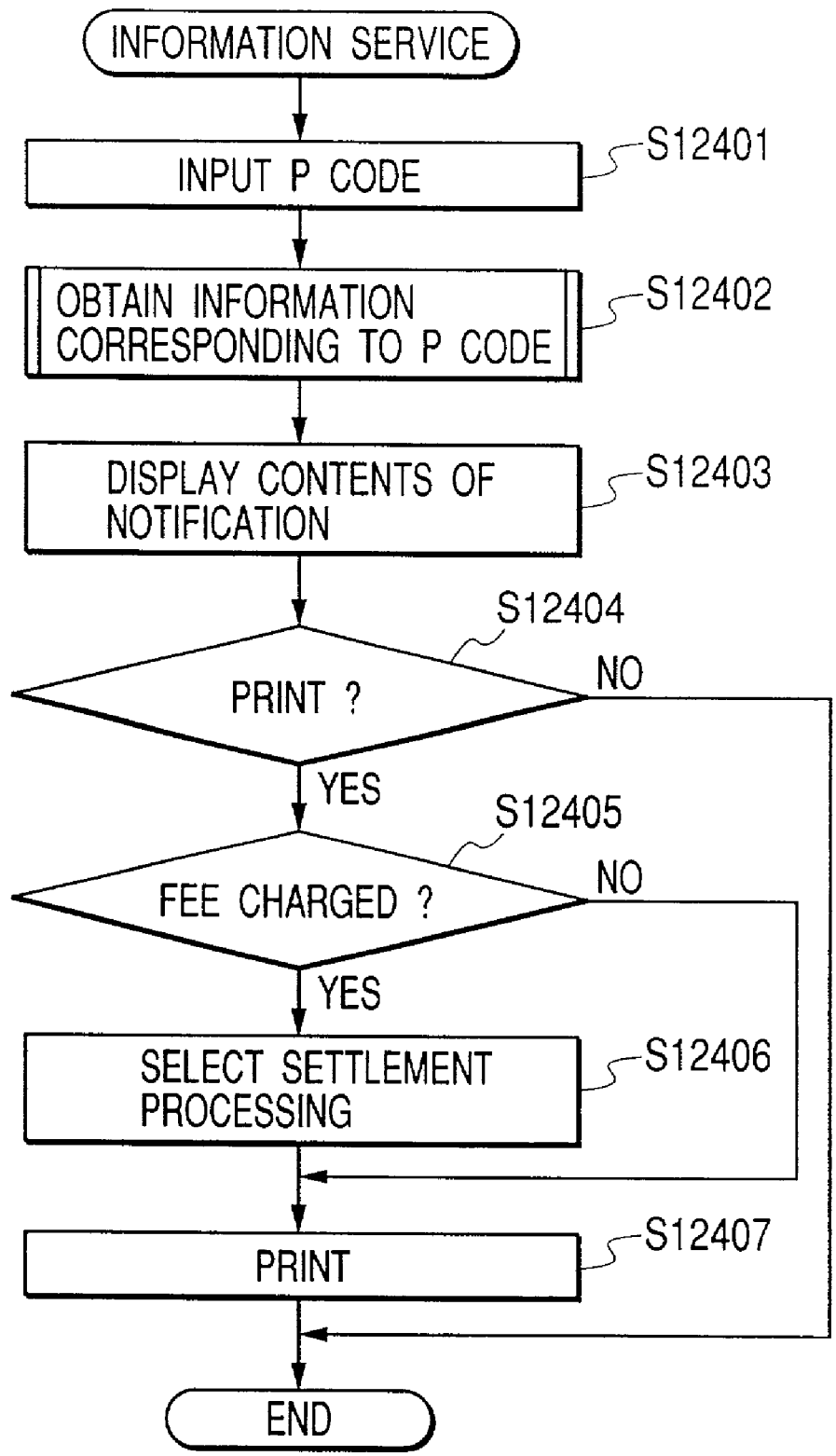
FIG. 34 is a flow chart showing a processing flow in the case where an information service is executed.
Figure 35:
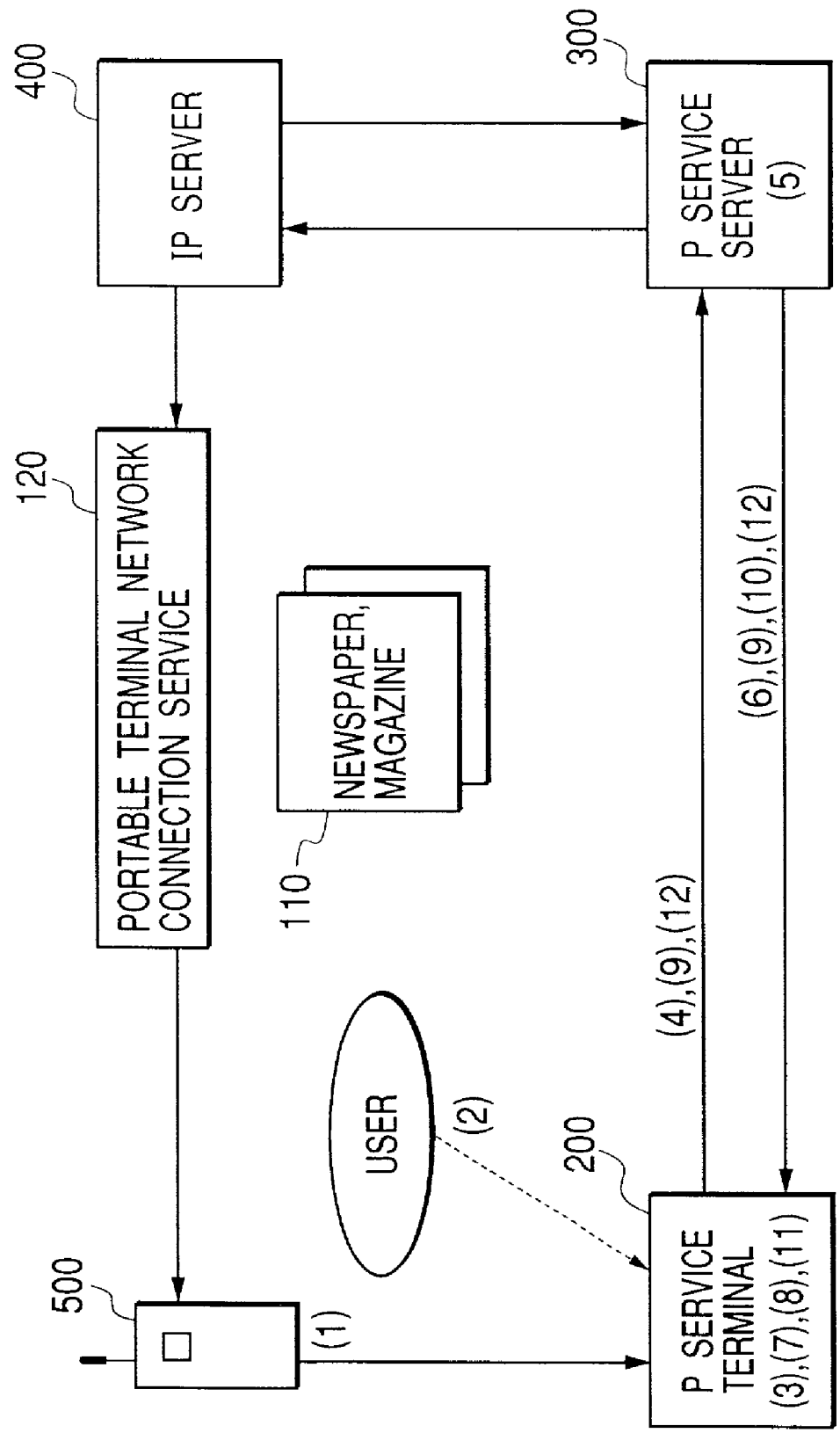
FIG. 35 illustrates an order of processing in the service system in the case where the information service is executed.

Processing flow in the case where a P code for an information service is inputted will now be described with reference to FIGS. 34 and 35. FIG. 34 is a flow chart showing a processing flow in the case where an information service of this embodiment is executed. In addition, FIG. 35 is a figure showing a processing order in a service system in the case where an information service of this embodiment is executed.

First, in step S12401, (1) a user obtains a P code by the portable terminal 500. (2) The user moves to the P service terminal 200 in a state that the P code is stored in the portable terminal 500. (3) The P code is inputted to the P service terminal 200. (4) The P service terminal 200 transmits the inputted P code and a terminal property (a location, a printer performance or the like) of the P service terminal 200 itself to the P service server 300.

In step S12402, (5) the P service server 300 obtains the information corresponding to the received P code. In step S12403, (6) the P service server 300 transmits the contents of the obtained information, for example, property data such as a service classification, a preview image, a number of pages or the like to the P service terminal 200. (7) The P service terminal 200 displays the received contents of the information such as the property data, the preview image and the number of pages on the touch panel 204. Here, if an instruction of a print preview or setting of an advertisement is instructed, the P service terminal 200 properly displays a corresponding screen and receives an input from the user.

In step S12404, (8) the P service terminal 200 determines whether or not printing of the displayed information has been instructed. (9) If cancellation of printing has been instructed (NO in step S12404), the P service terminal 200 notifies the P service server 300 of the effect that cancellation has been instructed and ends the processing. On the other hand, (9) if printing has been instructed (YES in step S12404), the P service terminal 200 requests the P service server 300 to prepare print data of the information corresponding to the P code and the processing advances to step S12405.

In step S12405, the P service terminal 200 determines whether or not information to be printed is charged. (10) If it is free (NO in step S12405), the processing advances to print processing. On the other hand, (11) if it is charged (YES in step S12405), the processing advances to step S12406 and receives a method of settlement of settlement processing in printing from the user, and (12) the P service terminal 200 and the P service server 300 transmit and receive necessary data according to the method of settlement (FIG. 31). Then, the P service terminal 200 receives print data of a print object information from the P service server 300 to print the information in step S12407.

If a P code for a distribution service is inputted and if a P code for a personal information service is inputted, a password is confirmed between the P service terminal 200 and the P service server 300 after the P code is inputted. Since subsequent processing from obtaining to printing of information processing is substantially the same as that in the case where a P code for an information service is inputted, its description is omitted here.

<Advertisement Search Processing>

In a P service system, if a user obtains print output in the P service terminal 200, a fixed advertisement information is automatically added to the print except the case where the user reject it or the case where the information provider or the like rejects it. Search processing of advertisement information to be added at the time will be hereinafter described.

FIG. 36 is a flow chart of advertisement search processing.

In step S13301, a keyword list of information of an information service or a personal information service to be an object of print output, a mail of a mailing service or information of a distribution service is prepared. This keyword list is prepared as described below according to contents of the services.

In the case of the information service or the personal information service, a keyword is extracted with reference to a property of its IP information, a property of a user registration of a user and a property of the P service terminal 200 in which print output is performed.

In the case of the mailing service, a keyword is extracted with reference to a property of a user registration of a user and a property of the P service terminal 200 in which print output is performed.

In the cases of the distribution service and the receiving service, a keyword is extracted with reference to a property of the P service terminal 200 in which print output is performed and, if a user has made a user registration, with reference to a property of the user registration as well.

A keyword list can be prepared for each piece of information in any of the services. For example, in the case of the information service, a keyword list of a property of IP information, a keyword list of a property of a user registration and a keyword list of a property of the P service terminal 200 can be prepared, respectively. In addition, a numerical value called "weight" is given to each keyword. This numerical value is a numerical value that is given for each keyword taking socially accepted ideas into account and based on the contents on the P service system side and is used for defining a priority of advertisement information in this advertisement search processing.

In step S13302, using each keyword as a search key based on the keyword list prepared in step S13301, advertisement information having a keyword coinciding with the search key is searched. A list of the search results is prepared in step S13303. A degree of coincidence of the searched advertisement information is simultaneously calculated making use of a weight of the each keyword.

In step S13304, each piece of the advertisement information is rearranged with reference to a property and a degree of coincidence enumerated in the search result list.

In step S13305, an example layout of the advertisement information is prepared. A plurality of example layouts are prepared by picking up the pieces of advertisement information in the order of a priority from the rearranged search result list.

In step S13306, one example layout, which is considered to be the most appropriate taking a request of a user, a print size, a total charge or the like into account, is selected out of the example layouts of the advertisement information. Then, a P code, conditions of a layout and the like of the advertisement information are specified and temporarily saved, and the advertisement search processing is complete.

<Other Embodiments>

Further, the present invention may be applied to a system composed of a plurality of appliances (e.g., a host computer, an interface apparatus, a reader, a printer and the like) or may be applied to an apparatus consisting of one appliance (e.g., a copying machine, a facsimile machine and the like).

In addition, it is needless to mention that a storage medium having a program code for software for realizing the functions of the above-mentioned embodiments recorded therein is supplied to a system or an apparatus and a computer (or a CPU or an MPU) of the system or the apparatus reads and executes the program code stored in the storage medium, whereby the objects of the present invention are attained.

In this case, since the program code itself read from the storage medium realizes the functions of the above-mentioned embodiments, the storage medium having the program code stored therein constitutes the present invention.

As a storage medium for supplying a program code, for example, a floppy disk, a hard disk, an optical disk, a magneto-optical disk, a CD-ROM, a CD-R, a magnetic tape, a nonvolatile memory card, an ROM or the like can be used.

In addition, it is needless to mention that, by executing the program code read by the computer, not only the functions of the above-mentioned embodiments are realized, but also an OS (operating system) or the like running on the computer performs a part of or all of the actual processing based on an instruction of the program code, and the functions of the above-mentioned embodiments are realized by the processing.

Moreover, it is needless to mention that the program code read from the storage medium is written in a function extension board inserted in the computer or a memory provided in a function extension unit connected to the computer, and then a CPU or the like provided in the function extension board or the function extension unit performs a part of or all of the actual processing based on an instruction of the program code, and the functions of the above-mentioned embodiment are realized.

In addition, although it is determined in the mail server 600 whether or not an electronic mail can be displayed on a portable terminal upon receiving the electronic mail and then decoding and registration of electronic mail information are performed in the P service server 300 in this embodiment, processing up to decoding of electronic mail information may be performed in the mail server 600 and only registration and storage of decomposed information may be performed in the P service server 300.

Moreover, the P service server 300 may be a server including the functions of the mail server 600. In this case, it is needless to mention that the communication mail server 600 and the P service server 300 do not communicate by using the communication portions but perform communication between applications in the same server.

As described above, according to the present invention, information of an electronic mail that cannot be fully displayed on a portable terminal can be provided to the electronic mail user who received the electronic mail.

As many apparently widely different embodiments of the present invention can be made without departing from the spirit and scope thereof, it is to be understood that the invention is not limited to the specific embodiments thereof except as defined in the appended claims.

What is claimed is:

1. An electronic mail providing system comprising a mail server, a WWW server and an output apparatus,
   wherein said mail server comprises:
      first receiving means for receiving an electronic mail;
      determining means for determining whether or not the received electronic mail can be displayed on a destination device of the received electronic mail;
      transferring means for transferring the received electronic mail to said WWW server, if said determining means determines that the destination device can not display the received electronic mail;
      identification code receiving means for receiving, from said WWW server, an identification code for identifying the transferred electronic mail; and
      notifying means notifying the received identification code to the destination device,
   wherein said WWW server comprises:
      storing means for storing an address of the destination device in correspondence with the identification code;
      address receiving means for receiving, from said mail server, the address of the destination device, included in header information of the electronic mail; and
      saving means for saving the identification code corresponding to the received address, in correspondence with the transferred electronic mail, and
   wherein said output apparatus comprises:
      identification code inputting means for inputting an identification code in response to user's operation;
      identification code transmitting means for transmitting the input identification code to said WWW server;
      second electronic mail receiving means for receiving, from said WWW server, the electronic mail corresponding to the transmitted identification code; and
      display means for displaying the electronic mail.

2. A system according to claim 1, wherein said output apparatus further comprises:
   print instruction inputting means for inputting a print instruction of the electronic mail in response to the user's operation;
   print data receiving means for receiving, from said WWW server, print data of the electronic mail whose print is instructed; and
   printing means for printing the received print data.

3. A control method of an electronic mail providing system comprising a mail server, a WWW server and an output apparatus, the control method comprising:

controlling said mail server including:

receiving an electronic mail;

determining whether or not the received electronic mail can be displayed on a destination device of the received electronic mail;

transferring the received electronic mail to said WWW server, if said determining means determines that the destination device can not display the received electronic mail;

receiving, from said WWW server, an identification code for identifying the transferred electronic mail; and notifying the received identification code to the destination device;

controlling said WWW server including:

storing an address of the destination device in correspondence with the identification code;

receiving, from said mail server, the address of the destination device, included in header information of the electronic mail; and saving the identification code corresponding to the received address, in correspondence with the transferred electronic mail; and controlling said output apparatus including:

inputting an identification code in response to user's operation;

transmitting the input identification code to said WWW server;

receiving, from said WWW server, the electronic mail corresponding to the transmitted identification code; and displaying the electronic mail.

* * * * *